United States Patent
Ito

(10) Patent No.: US 11,016,599 B2
(45) Date of Patent: May 25, 2021

(54) LIGHT DISTRIBUTION CONTROLLABLE TOUCH PANEL DEVICE AND DISPLAY DEVICE

(71) Applicant: TIANMA JAPAN, LTD., Kanagawa (JP)

(72) Inventor: Yuki Ito, Kawasaki (JP)

(73) Assignee: TIANMA MICROELECTRONICS CO., LTD., Chenzhen (CN)

( * ) Notice: Subject to any disclaimer, the term of this patent is extended or adjusted under 35 U.S.C. 154(b) by 0 days.

(21) Appl. No.: 16/140,901

(22) Filed: Sep. 25, 2018

(65) Prior Publication Data

US 2019/0102007 A1 Apr. 4, 2019

(30) Foreign Application Priority Data

Sep. 29, 2017 (JP) .............................. JP2017-190776

(51) Int. Cl.
*G06F 3/041* (2006.01)
*G06F 3/044* (2006.01)
*G02F 1/167* (2019.01)

(52) U.S. Cl.
CPC ............ *G06F 3/0416* (2013.01); *G02F 1/167* (2013.01); *G06F 3/0412* (2013.01); *G06F 3/0445* (2019.05); *G06F 3/0446* (2019.05)

(58) Field of Classification Search
CPC ...... G06F 3/044; G06F 3/0412; G06F 3/0416; G02F 1/167; G09G 3/344
See application file for complete search history.

(56) References Cited

U.S. PATENT DOCUMENTS

| | | | | |
|---|---|---|---|---|
| 2009/0237392 A1* | 9/2009 | Kajino | ................... | G09G 3/344 345/214 |
| 2010/0188395 A1* | 7/2010 | Uchida | ................... | G09G 3/344 345/214 |
| 2014/0347407 A1* | 11/2014 | Wang | ...................... | G02F 1/167 345/690 |
| 2016/0004372 A1* | 1/2016 | Nakajima | ............... | G06F 3/044 345/174 |
| 2016/0077363 A1 | 3/2016 | Shiota | | |
| 2017/0010516 A1* | 1/2017 | Shiota | ..................... | G02F 1/167 |

FOREIGN PATENT DOCUMENTS

| | | |
|---|---|---|
| JP | 2009-086875 A | 4/2009 |
| JP | 2016-062091 A | 4/2016 |

* cited by examiner

*Primary Examiner* — Stephen G Sherman
(74) *Attorney, Agent, or Firm* — Sughrue Mion, PLLC

(57) ABSTRACT

Disclosed is a light distribution controllable touch panel device including: an upper transparent substrate; a lower transparent substrate; one or more lower light distribution control electrodes on a top face of the lower transparent substrate; touch panel electrodes on an underface of the upper transparent substrate; electrophoretic elements sandwiched between the one or more lower light distribution control electrodes and the touch panel electrodes, each of the electrophoretic elements including colored electrophoretic particles and dispersion medium; and a controller. The controller is configured to: provide driving potentials to the touch panel electrodes in measuring capacitances for detecting a touch point; and provide driving potentials to the one or more lower light distribution control electrodes with reference to the driving potentials given to the touch panel electrodes to control a state of the colored electrophoretic particles in the plurality of electrophoretic elements.

9 Claims, 15 Drawing Sheets

LIGHT DISTRIBUTION CONTROLLABLE TOUCH PANEL DEVICE AND DISPLAY DEVICE

CROSS-REFERENCE TO RELATED APPLICATIONS

This Non-provisional application claims priority under 35 U.S.C. § 119(a) on Patent Application No. 2017-190776 filed in Japan on Sep. 29, 2017, the entire content of which is hereby incorporated by reference.

BACKGROUND

This disclosure relates to a light distribution controllable touch panel device and a display device.

In recent years, touch panels have been widely known as user-friendly user interface with the prevalence of smartphones and tablet terminals. Touch panels are mounted on the display modules of various electronic devices. Meanwhile, in order to prevent the image displayed on a smartphone, an ATM, or an in-flight entertainment screen from being viewed from people other than the user, viewing angle control devices are used.

When a touch panel and a viewing angle control device are individually mounted on a display panel, the thicknesses of the individual devices increase the total thickness of the display device. In the configuration where the viewing angle controllable device is provided between the touch panel and the display panel, the touch panel is fairly distant from the display panel; the operability of the touch panel is impaired. Furthermore, the display device includes more interface with the air layer, so that the surface reflection of the external light impairs the visibility.

JP 2009-86875 A discloses a viewing angle controllable touch panel, specifically, a touch panel having a touch panel layer in which two plate-like members provided with electrodes on one-side faces are disposed such that the electrodes face to each other at a prescribed interval and a visual field angle control layer in which a plurality of louver members are installed between two plate-like members at a prescribed angle. In the touch panel, one plate-like member of the two plate-like members constituting the touch panel layer is used as one plate-like member of the two plate-like members constituting the visual field angle control layer.

The configuration according to JP 2009-86875 A achieves a thin viewing angle controllable touch panel having high light transmittance with a fewer number of components, a fewer number of laminated layers, and a fewer number of manufacturing steps. However, the louver members (the visual field angle control layer) in JP 2009-86875 A are static and cannot control the viewing angle dynamically.

JP 2016-62091 A discloses a light distribution controllable device that electrically controls the viewing angle with electrophoretic elements.

SUMMARY

An aspect of the disclosure is a light distribution controllable touch panel device including: an upper transparent substrate; a lower transparent substrate; one or more lower light distribution control electrodes on a top face of the lower transparent substrate; a plurality of touch panel electrodes on an underface of the upper transparent substrate; a plurality of electrophoretic elements sandwiched between the one or more lower light distribution control electrodes and the plurality of touch panel electrodes, each of the electrophoretic elements including colored electrophoretic particles and dispersion medium; and a controller. The controller is configured to: provide driving potentials to the plurality of touch panel electrodes in measuring capacitances for detecting a touch point; and provide driving potentials to the one or more lower light distribution control electrodes with reference to the driving potentials given to the plurality of touch panel electrodes to control a state of the colored electrophoretic particles in the plurality of electrophoretic elements.

It is to be understood that both the foregoing general description and the following detailed description are exemplary and explanatory and are not restrictive of this disclosure.

EMBODIMENTS

Figure 1:
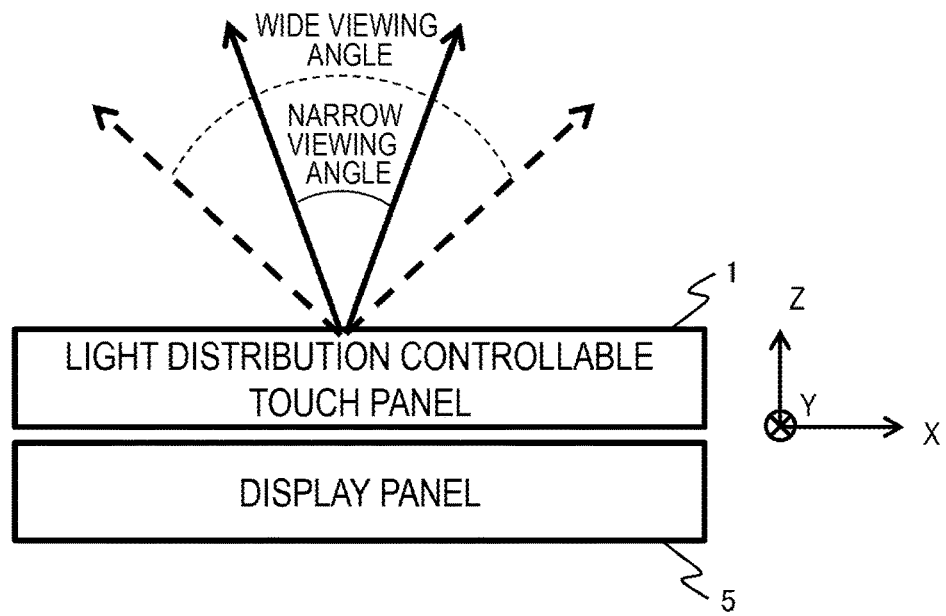
FIG. 1 schematically illustrates a configuration example of a display device.

Hereinafter, embodiments of this invention will be described with reference to the accompanying drawings. The embodiments are merely examples to implement this invention and are not to limit the technical scope of this invention. Elements common to the drawings are denoted by the same reference signs. For clarity of explanation, the sizes and the shapes of the elements may be exaggerated in the drawings.

The light distribution controllable touch panel disclosed hereinafter includes an upper transparent substrate, a lower transparent substrate, and electrophoretic elements disposed alternately with light transmissive regions between the upper transparent substrate and the lower transparent substrate. Each electrophoretic element includes colored electrophoretic particles in dispersion medium. The light distribution controllable touch panel has a narrow viewing angle mode and a wide viewing angle mode. The colored electrophoretic particles are dispersed in the narrow viewing angle mode and collected in the wide viewing angle mode.

On the underface of the upper transparent substrate, touch panel electrodes for detecting a touch point are arrayed. The electrophoretic elements are sandwiched between the touch panel electrodes and lower light distribution control electrodes provided on the top face of the lower transparent substrate. A controller provides driving potentials to the touch panel electrodes in measuring the capacitances to detect a touch point and provides potentials to the lower light distribution control electrodes with reference to the driving potentials. This configuration enables detection of a touch point and conservation of the state of the electrophoretic elements in the selected viewing angle mode.

The touch panel electrodes are provided with signals (potentials) to provide a touch panel function. The touch panel electrodes also function as upper light distribution control electrodes. Accordingly, the lower light distribution control electrodes need to be provided with potentials for appropriately controlling the colored electrophoretic particles with reference to the potentials of the touch panel electrodes.

To share the touch panel electrodes between the touch panel part and the light distribution control panel part, the light distribution controllable touch panel in this disclosure employs a projected capacitive touch panel. The projected capacitive touch panel detects a contact point of the pointer by detecting a change in capacitance occurring between an electrode and a pointer.

First Embodiment

Configuration

FIG. 1 schematically illustrates a configuration example of a display device in the first embodiment. The display device includes a display panel 5 and a light distribution controllable touch panel 1 provided in front of the display panel 5. The display panel 5 can be of any type, such as a liquid crystal display panel or an organic light-emitting diode (OLED) display panel.

In this disclosure, the side of the user who sees the image on the display panel 5, or the side to which the light of the image travels is referred to as front side or upper side of the display device and the opposite side is referred to as back side or lower side of the display device. The direction perpendicular to the principal plane of the display panel 5 or the light distribution controllable touch panel 1 is referred to as Z-axis direction, the two directions perpendicular to each other within the principal plane are referred to as X-axis direction (second direction) and Y-axis direction (first direction). The Z-axis direction corresponds to the stacking direction of the display panel 5 and the light distribution controllable touch panel 1.

The light distribution controllable touch panel 1 has a function of a touch panel and further, a function to control the range of outgoing direction of the light transmitted through the light distribution controllable touch panel 1 out of the light emitted from the display panel 5. The light distribution controllable touch panel 1 is switchable between a wide viewing field state and a narrow viewing field state to transmit the image on the display panel 5. The state (mode) in which the range of outgoing direction of the light from the light distribution controllable touch panel 1 is wider is referred to as wide viewing field state (wide viewing angle mode) and the state (mode) in which the range of outgoing direction of the light from the light distribution controllable touch panel 1 is narrower is referred to as narrow viewing field state (narrow viewing angle mode).

Figure 2:
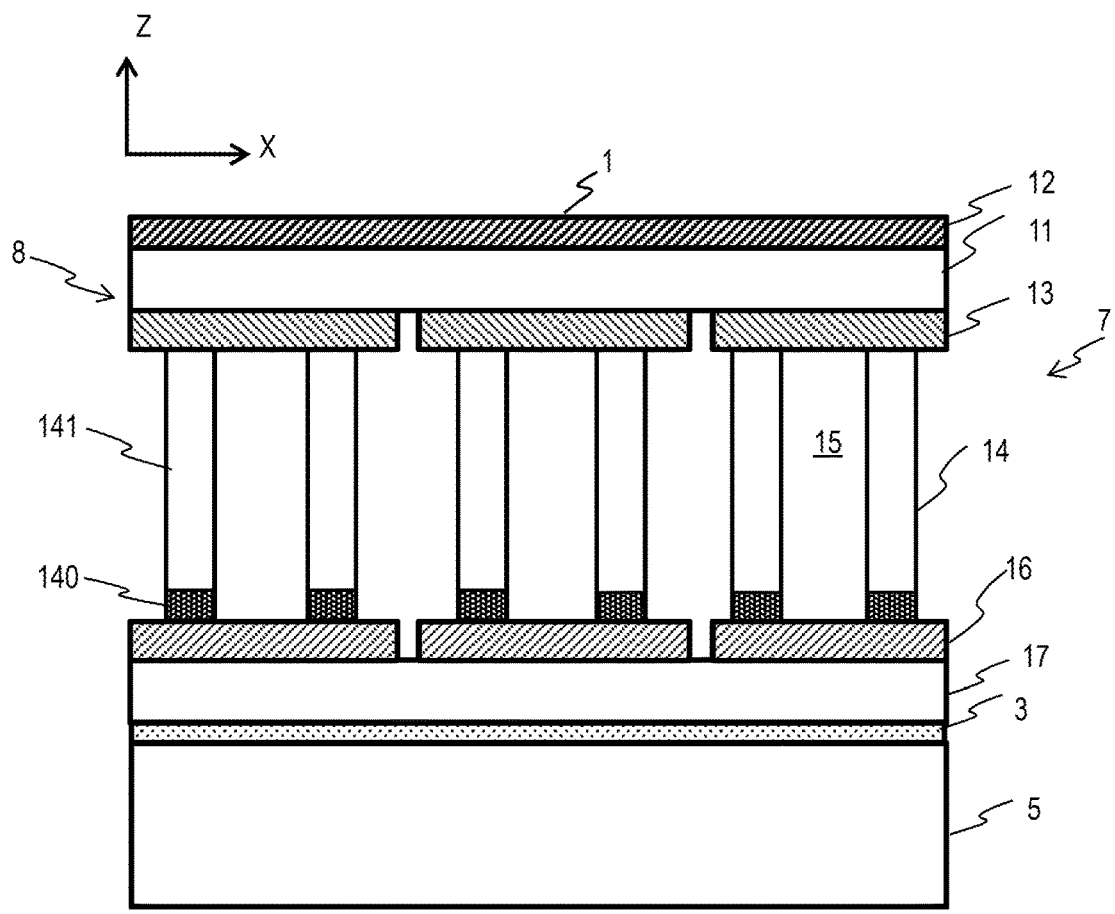
FIG. 2 schematically illustrates an example of a cross-sectional structure of a light distribution controllable touch panel.

FIG. 2 schematically illustrates an example of a cross-sectional structure of the light distribution controllable touch panel 1. FIG. 2 represents the light distribution controllable touch panel 1 in the wide viewing field state. The light distribution controllable touch panel 1 changes the state of the colored electrophoretic particles (colored charged particles) 140 to change the range of outgoing direction of the light transmitted through the light transmissive region 15 and the dispersion medium 141.

The light distribution controllable touch panel 1 is bonded to the front face (top face) of the display panel 5 with a bonding layer 3. The bonding layer 3 between the light distribution controllable touch panel 1 and the display panel 5 may be provided only the outer periphery of those panels.

The light distribution controllable touch panel 1 includes an upper transparent substrate 11 and a lower transparent substrate 17. The underface of the lower transparent substrate 17 is opposed to the display panel 5; the top face is opposed to the underface of the upper transparent substrate 11. The upper transparent substrate 11 and the lower transparent substrate 17 are made of glass, polyethylene terephthalate (PET), poly carbonate (PC), or polyethylene naphthalate (PEN). The upper transparent substrate 11 and the lower transparent substrate 17 are inflexible or flexible insulators.

The light distribution controllable touch panel 1 further includes a plurality of upper touch panel electrodes 12, a plurality of lower touch panel electrodes 13, and a plurality of lower light distribution control electrodes 16. The upper touch panel electrodes 12, the lower touch panel electrodes 13, and the lower light distribution control electrodes 16 are transparent electrodes and can be made of indium tin oxide (ITO), ZnO, or IGZO, for example.

The plurality of lower light distribution control electrodes 16 (a lower light distribution control electrode pattern) are provided on the top face of the lower transparent substrate 17. The lower light distribution control electrodes 16 are disposed to extend in the Y-axis direction and be distant from one another in the X-axis direction on the lower transparent substrate 17. Each lower light distribution control electrode 16 can be a strip-like conductor.

The plurality of lower touch panel electrodes 13 (a lower touch panel electrode pattern) are provided on the underface of the upper transparent substrate 11. Either the gaps between lower light distribution control electrodes 16 or the gaps between lower touch panel electrodes 13 are filled with an insulating material (ribs 15 to be described later). The lower touch panel electrodes 13 are disposed to extend in the Y-axis direction and be distant from one another in the X-axis direction on the upper transparent substrate 11. Each lower touch panel electrode 13 can be a strip-like conductor. Each lower touch panel electrodes 13 is opposed to one or more lower light distribution control electrodes 16.

As will be described later, the lower touch panel electrodes 13 are also upper light distribution control electrodes. In an example, the lower touch panel electrodes 13 are opposed to the lower light distribution control electrodes 16 in one-to-one correspondence. In an example, each lower touch panel electrode 13 has the same shape as the opposed lower light distribution control electrode 16. A plurality of lower light distribution control electrodes 16 can be opposed to one lower touch panel electrode 13 or a plurality of lower touch panel electrodes 13 can be opposed to one lower light distribution control electrode 16.

The plurality of upper touch panel electrodes 12 (an upper touch panel electrode pattern) are provided on the top face of the upper transparent substrate 11. The upper touch panel electrodes 12 are covered with an insulating material such as silicon nitride. The upper touch panel electrodes 12 are disposed to extend in the X-axis direction and to be distant from one another in the Y-axis direction on the upper transparent substrate 11. Each upper touch panel electrode 12 can be a strip-like conductor.

The light distribution controllable touch panel 1 includes a light distribution control layer between the upper transparent substrate 11 and the lower transparent substrate 17. The light distribution control layer includes a plurality of electrophoretic elements 14 and a plurality of ribs 15. Each rib 15 is a light transmissive region. The electrophoretic elements 14 and the ribs 15 are disposed to extend in the Y-axis direction and be alternate with one another in the X-axis direction.

In the X-Y plane, the plurality of electrophoretic elements 14 have a stripe pattern in which the electrophoretic elements 14 are disposed to extend in the Y-axis direction and be side by side in the X-axis direction. In similar, the plurality of ribs 15 have a stripe pattern in which the ribs 15 are disposed to extend in the Y-axis direction and be side by side in the X-axis direction.

The ribs 15 can be made of a photo-curable material. The ribs 15 have a height of 3 to 300 μm and a width of 1 to 150 μm, for example. The gap between the ribs 15 is 0.25 to 40 μm, for example. The widths and the pitch of the lower touch panel electrodes 13 are several millimeters and the widths and the pitch of the upper touch panel electrodes 12 are also several millimeters. Although two electrophoretic elements 14 are sandwiched by a pair of electrodes in the schematic diagram of FIG. 2, more electrophoretic elements 14 are sandwiched by a pair of electrodes in a typical light distribution controllable touch panel 1.

Each electrophoretic element 14 includes electrophoretic particles 140 and dispersion medium 141 (electrophoretic element material) contained in a space formed between ribs 15. The electrophoretic particles 140 are colored, for example, in black. The dispersion medium 141 can be made of a transparent and colorless liquid material.

Each electrophoretic element 14 is sandwiched by one lower touch panel electrode 13 and one lower light distribution control electrode 16. In the example of FIG. 2, the lower touch panel electrode 13 and the lower light distribution control electrode 16 are in contact with the electrophoretic element material including the electrophoretic particles 140 and the dispersion medium 141. Between either one or both of the lower touch panel electrode 13 and the lower light distribution control electrode 16 and the electrophoretic element material, an insulating layer may be provided. The insulating layer can be made of silicon oxide or silicon nitride.

In the example of FIG. 2, a plurality of successive electrophoretic elements 14 (and ribs 15) are sandwiched by one lower touch panel electrode 13 and one lower light distribution control electrode 16. That is to say, each lower touch panel electrode 13 is opposed to a plurality of electrophoretic elements 14 in the Z-axis direction. In similar, each lower light distribution control electrode 16 is opposed to a plurality of electrophoretic elements 14 in the Z-axis direction.

Figure 13A:
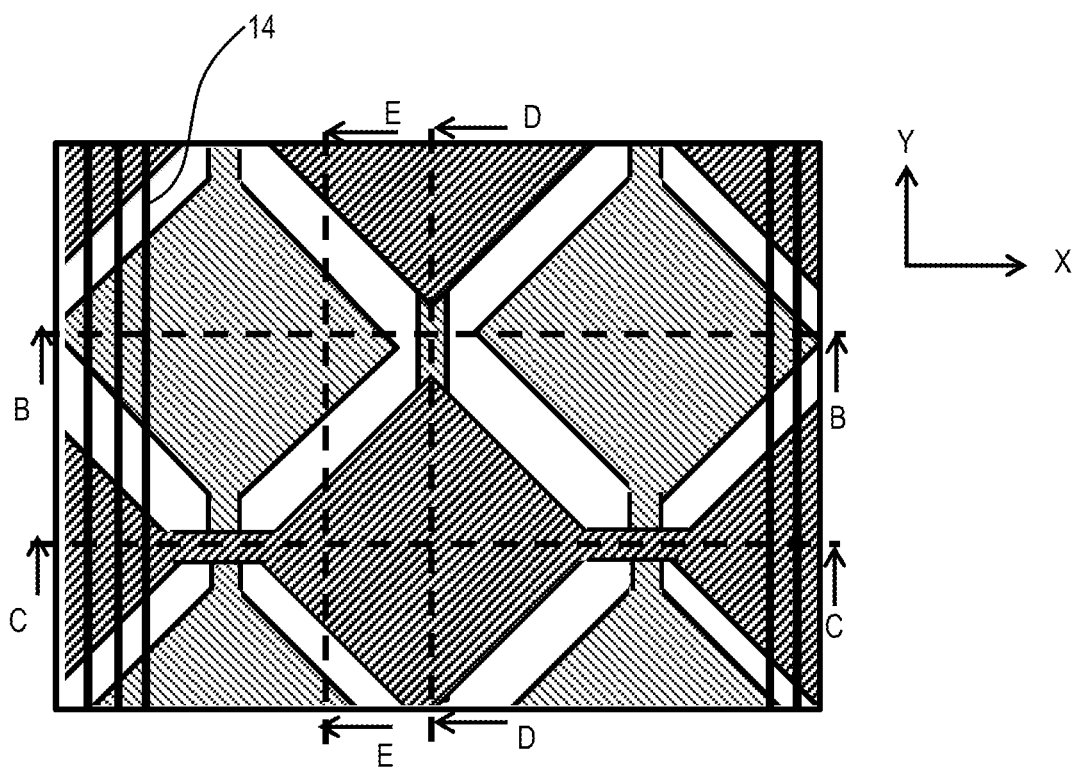
FIG. 13A illustrates electrophoretic elements and the patterns of the upper touch panel electrodes and the lower touch panel electrodes on the upper transparent substrate.

As alternative examples, the electrophoretic elements 14 may be sandwiched by different pairs of lower touch panel electrodes 13 and lower light distribution control electrodes 16 (see FIG. 13A). A plurality of electrophoretic elements 14 may be sandwiched by one lower touch panel electrode 13 and a plurality of lower light distribution control electrodes 16. The plurality of electrophoretic elements 14 may be sandwiched by a plurality of lower touch panel electrodes 13 and one lower light distribution control electrode 16.

Figure 3:
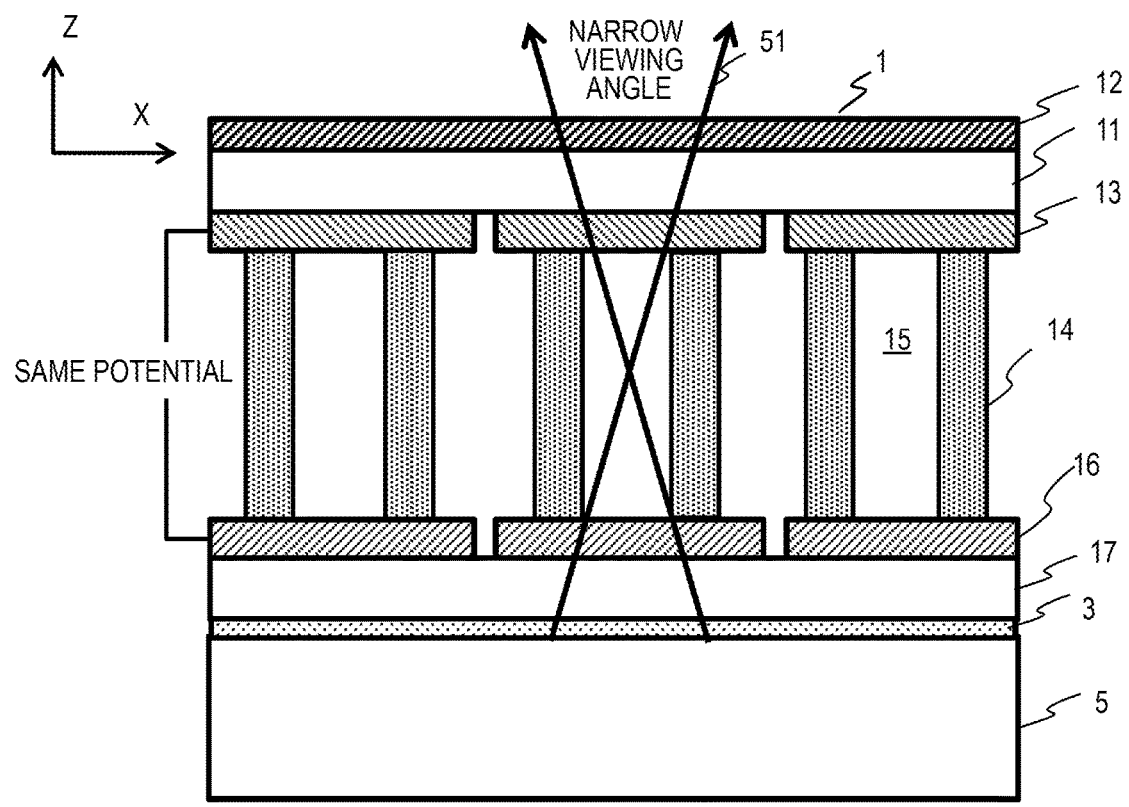
FIG. 3 illustrates the light distribution controllable touch panel in a narrow viewing field state.

FIG. 3 illustrates the light distribution controllable touch panel 1 in a narrow viewing field state. In the narrow viewing field state, the electrophoretic particles 140 in each electrophoretic element 14 are dispersed in the dispersion medium 141. The dispersed electrophoretic particles 140 block the light from the display panel 5 by absorbing the light. As a result, only the light 51 within a narrow outgoing angle in the X-axis direction passes through the light distribution controllable touch panel 1.

In the narrow viewing field state, the lower touch panel electrode 13 and the lower light distribution control electrode 16 sandwiching an electrophoretic element 14 are maintained at the same potential. As a result, the electrophoretic particles 140 in the dispersion medium 141 are maintained in a dispersed state. The lower touch panel electrode 13 is provided with a specific signal for the touch panel function. The details of the potential control for the lower touch panel electrodes 13 and the lower light distribution control electrodes 16 will be described later.

Figure 4:
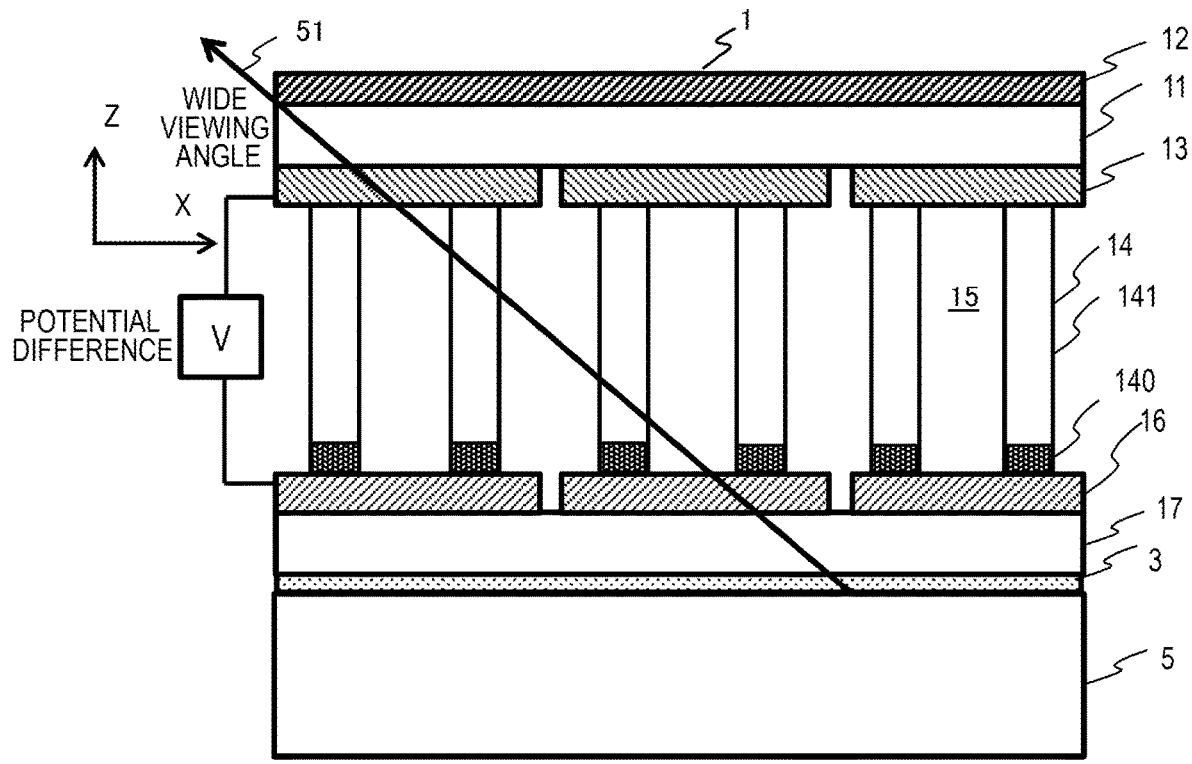
FIG. 4 illustrates the light distribution controllable touch panel in a wide viewing field state.

FIG. 4 illustrates the light distribution controllable touch panel 1 in a wide viewing field state. The wide viewing field state is achieved by collecting the electrophoretic particles 140 to the proximity of either one of the electrodes sandwiching the electrophoretic element 14, for example, the lower light distribution control electrode 16. The most part of the electrophoretic element 14 becomes composed of only the transparent dispersion medium 141 to make the electrophoretic element 14 transmissive. As a result, the light 51 within a wide outgoing angle in the X-axis direction passes through the light distribution controllable touch panel 1.

In the wide viewing field state, the relative potential of the lower light distribution control electrode 16 to the lower touch panel electrode 13 has the opposite polarity to the charge of the electrophoretic particles 140 (with a potential difference V). As a result, the electrophoretic particles 140 are gathered to the proximity of the lower light distribution control electrode 16.

For example, if the charge of the electrophoretic particles 140 is negative (−), the lower light distribution control electrode 16 and the lower touch panel electrode 13 are provided with predetermined potentials so that the lower light distribution control electrode 16 becomes a positive electrode. If the charge of the electrophoretic particles 140 is positive (+), the lower light distribution control electrode 16 and the lower touch panel electrode 13 are provided with predetermined potentials so that the lower light distribution control electrode 16 becomes a negative electrode. The potential difference V is to be approximately 20 to 25 V.

In the following description, it is assumed that the charge of the electrophoretic particles 140 is negative. If the charge of the electrophoretic particles 140 is positive, the description is applicable by changing the polarity of the lower light distribution control electrodes 16 to the opposite one.
Control Hereinafter, control of the light distribution controllable touch panel 1 is described. As described above, the light distribution controllable touch panel 1 has a touch panel function and a light distribution control function. To provide the two functions, the light distribution controllable touch panel 1 includes a light distribution control panel part 7 and a touch panel part 8 in front of the light distribution control panel part 7.

The touch panel part 8 includes the upper touch panel electrodes 12, the upper transparent substrate 11, and the lower touch panel electrodes 13. The light distribution control panel part 7 includes the upper transparent substrate 11, the lower touch panel electrodes 13, the electrophoretic elements 14, the ribs 15, the lower light distribution control electrodes 16, and the lower transparent substrate 17.

The upper transparent substrate 11 and the lower touch panel electrodes 13 are shared by the touch panel part 8 and the light distribution control panel part 7. This configuration achieves a thinner light distribution controllable touch panel 1 and further, increases the visibility of the displayed image and the operability of the touch panel.

The lower touch panel electrodes 13 are provided with signals (potentials) for providing the touch panel function. As described above, the lower touch panel electrodes 13 work as upper light distribution control electrodes. Accordingly, it is necessary to provide potentials for appropriately controlling the state of the electrophoretic particles 140 to the lower light distribution control electrodes 16 with reference to the potentials of the lower touch panel electrodes 13.

To share the lower touch panel electrodes 13 between the touch panel part 8 and the light distribution control panel part 7, the light distribution controllable touch panel 1 in this disclosure employs projected capacitive sensing. The projected capacitive touch panel detects the contact point of a pointer by detecting a change in capacitance occurring between an electrode and the pointer.

There are two types of schema for capacitive sensing in a projected capacitive touch panel: self-capacitance sensing and mutual capacitance sensing. A self-capacitance sensing type of touch panel has a plurality of X electrodes and a plurality of Y electrodes. The X electrodes and the Y electrodes are disposed in a matrix with an insulator interposed therebetween.

Self-capacitance sensing drives the X electrodes and the Y electrodes independently to detect a change in capacitance in each electrode. When a pointer approaches an electrode, the capacitance of the electrode increases. Self-capacitance sensing detects an X electrode and a Y electrode where the capacitance has increased to detect the position of the pointer.

A mutual capacitance sensing type of touch panel has transmitter electrodes (for example, X electrodes) as driver electrodes and receiver electrodes (for example, Y electrodes) as sensor electrodes. The driver electrodes and the sensor electrodes are disposed in a matrix with an insulator interposed therebetween. A capacitor (intersection capacitor) is configured at each intersection of a driver electrode and a sensor electrode. When a pointer approaches an intersection capacitor, a part of the electric field at the intersection moves toward the pointer and the capacitance at the intersection decreases. Mutual capacitance sensing detects at which intersection and how big the change in mutual capacitance occurs to detect the position of the pointer.

Figure 5A:
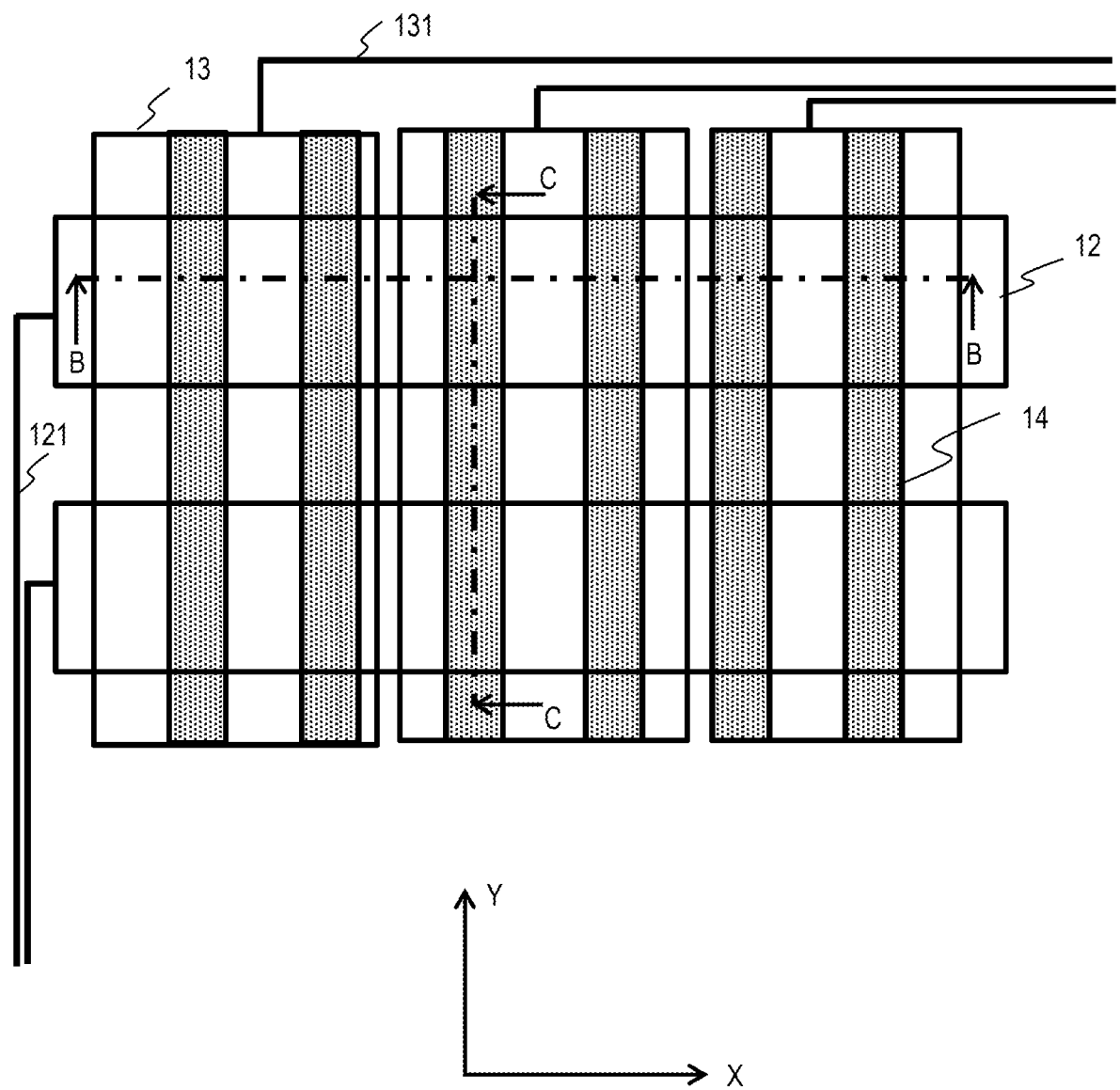
FIG. 5A is a plan diagram for illustrating a relation of a part of the components of the light distribution controllable touch panel.

In the following example of control of the light distribution controllable touch panel 1, touch detection is performed by self-capacitance sensing and/or mutual capacitance sensing. FIG. 5A is a plan diagram for illustrating a relation of a part of the components of the light distribution controllable touch panel 1.

A plurality of upper touch panel electrodes 12 are disposed to be distant from one another in the Y-axis direction. Each upper touch panel electrode 12 extends in the X-axis direction and has a strip-like shape. The shapes of the upper touch panel electrodes 12 are identical. A plurality of lower touch panel electrodes 13 are disposed to be distant from one another in the X-axis direction. Each lower touch panel electrode 13 extends in the Y-axis direction and has a strip-like shape. The shapes of the lower touch panel electrodes 13 are identical.

As understood from the above, the upper touch panel electrodes 12 and the lower touch panel electrodes 13 are disposed in a matrix. As described with reference to FIG. 2, the upper touch panel electrodes 12 and the lower touch panel electrodes 13 are provided on the top face and the underface, respectively, of the upper transparent substrate 11 to sandwich the insulative upper transparent substrate 11. As will be described later, the upper touch panel electrodes 12 are sensor electrodes and the lower touch panel electrodes 13 are transmitter electrodes 13 in mutual capacitance sensing.

A plurality of electrophoretic elements 14 are disposed to be distant from one another in the X-axis direction. Each electrophoretic element 14 extends in the Y-axis direction and has a shape of rectangular parallelepiped. The shapes of the electrophoretic elements 14 are identical. Lower light distribution control electrodes 16, which are not shown in FIG. 5A, are provided on the top face of the lower transparent substrate 17 in the same layout as the lower touch panel electrodes 13. The pattern of the lower light distribution control electrodes 16 opposed to a plurality of electrophoretic elements 14 and the pattern of the lower touch panel electrodes 13 opposed to a plurality of electrophoretic elements 14 are identical and superposed.

Figure 5B:
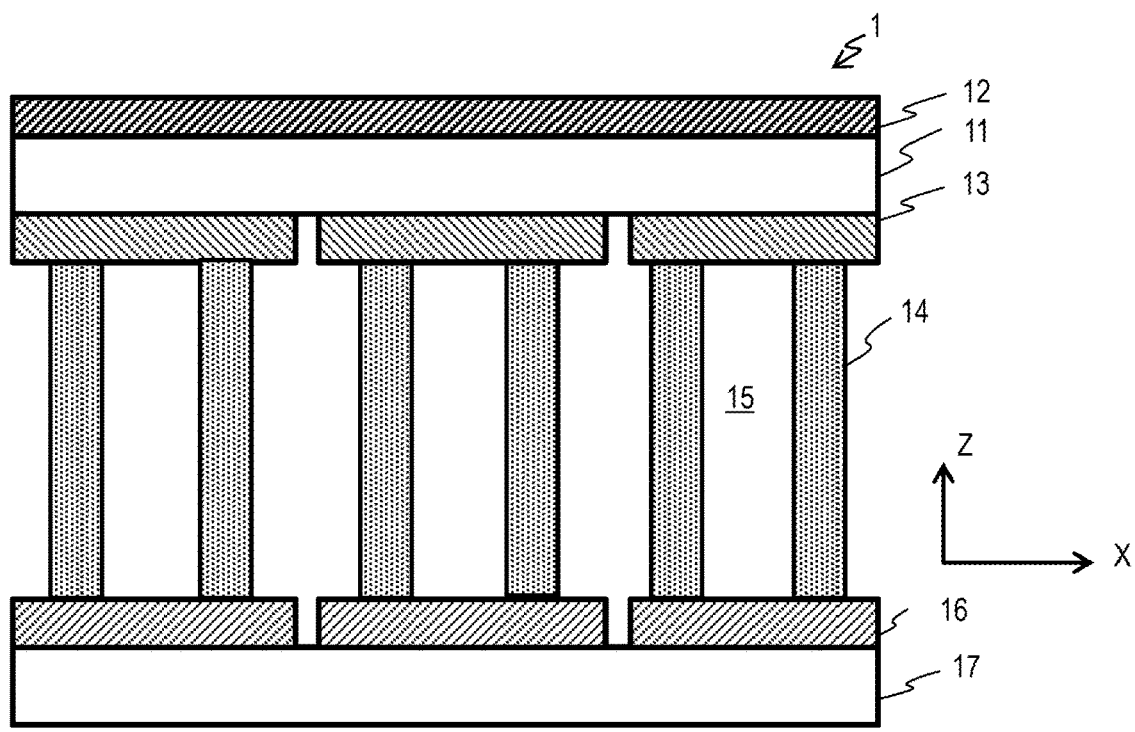
FIG. 5B schematically illustrates a cross-sectional structure of the light distribution controllable touch panel cut along the line B-B in FIG. 5A.

FIG. 5B schematically illustrates a cross-sectional structure of the light distribution controllable touch panel 1 cut along the line B-B in FIG. 5A. The section line B-B is a line parallel to the X-axis direction and FIG. 5B is a cross-sectional structure seen in the Y-axis direction. The cross-sectional structure in FIG. 5B is the same as the structure described with reference to FIGS. 2, 3, and 4.

In the example illustrated in FIG. 5B, each lower touch panel electrode 13 is opposed to a plurality of electrophoretic elements 14 and similarly, each lower light distribution control electrode 16 is opposed to a plurality of electrophoretic elements 14. That is to say, each pair of a lower touch panel electrode 13 and a lower light distribution control electrode 16 sandwich a plurality of electrophoretic elements 14 to drive these electrophoretic elements 14. In the example of FIG. 5B, each lower touch panel electrode 13 is opposed to only one lower light distribution control electrode 16. A lower touch panel electrode 13 and a lower light distribution control electrode 16 opposed to each other drive the same electrophoretic elements 14.

Figure 5C:
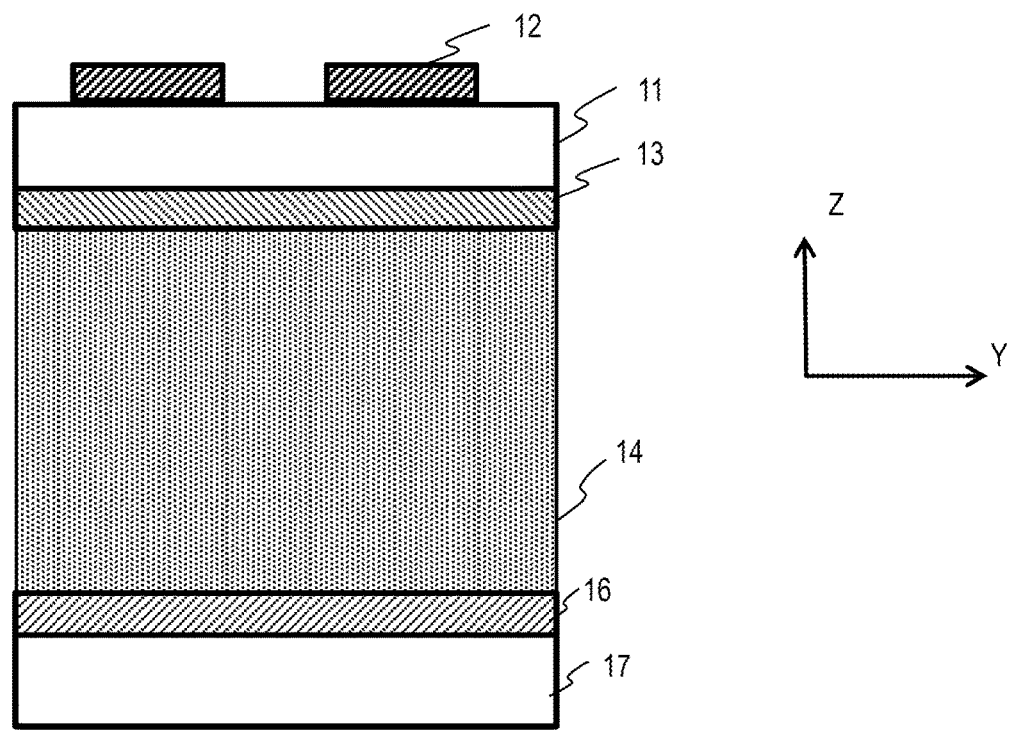
FIG. 5C schematically illustrates a cross-sectional structure of the light distribution controllable touch panel cut along the line C-C in FIG. 5A.

FIG. 5C schematically illustrates a cross-sectional structure of the light distribution controllable touch panel 1 cut along the line C-C in FIG. 5A. The section line C-C is a line parallel to the Y-axis direction and FIG. 5C is a cross-sectional structure seen in the X-axis direction. FIG. 5C represents the cross-sectional structure of the light distribution controllable touch panel 1 at an electrophoretic element 14. The entire top face of an electrophoretic element 14 faces one lower touch panel electrode 13 and the entire underface of the electrophoretic element 14 faces one lower light distribution control electrode 16.

Figure 6:
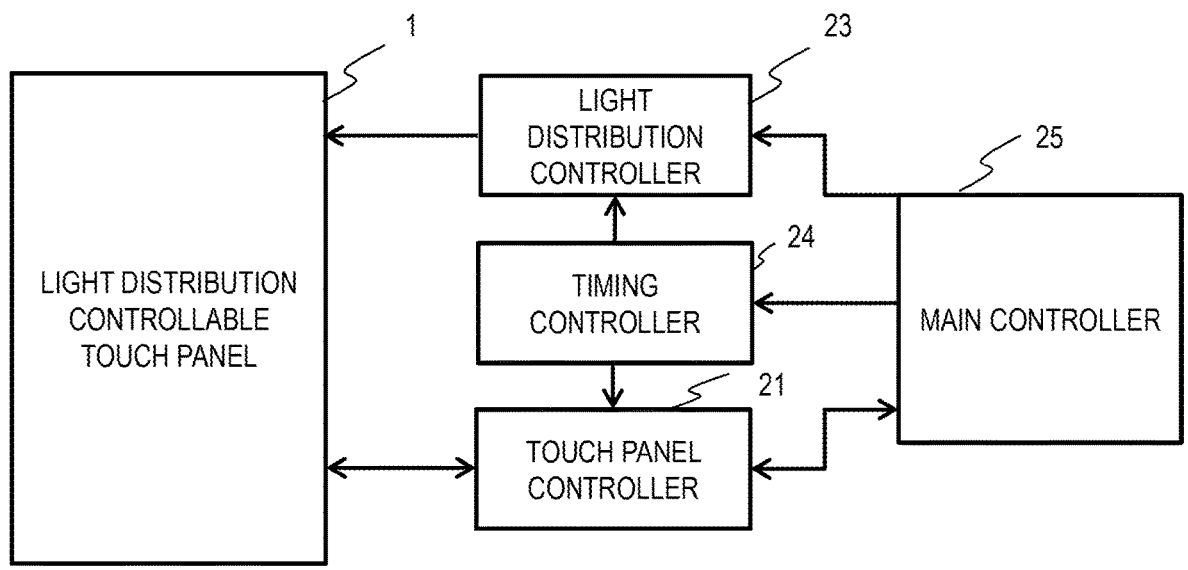
FIG. 6 schematically illustrates a logical configuration of a control system of the display device.

FIG. 6 schematically illustrates a logical configuration of a control system of the display device. The display device includes a touch panel controller 21, a light distribution controller 23, a timing controller 24, and a main controller 25. Each of these is configured with a processor operating in accordance with a program and/or a logical circuit for a specific function. The touch panel controller 21, the light distribution controller 23, the timing controller 24, and the main controller 25 may be configured with separate circuits or alternatively, a part or all of these controllers may share the same circuit (including the processor).

The touch panel controller 21 controls the touch panel part 8 of the light distribution controllable touch panel 1 to perform the touch panel function of the light distribution controllable touch panel 1. Specifically, the touch panel controller 21 controls the upper touch panel electrodes 12 and the lower touch panel electrodes 13 in response to a timing signal from the timing controller 24.

In this example, the touch panel controller 21 can detect a touch point of a pointer by either self-capacitance sensing or mutual capacitance sensing. The touch panel controller 21 switches the mode for detecting a touch point in accordance with an instruction from the main controller 25. In another example, the touch panel controller 21 detects a touch by only one of self-capacitance sensing and mutual capacitance sensing.

The touch panel controller 21 drives the driver electrodes in the upper touch panel electrodes 12 and the lower touch panel electrodes 13 in response to a timing signal from the timing controller 24 and further, detects a change in capacitance in the sensor electrodes. In mutual capacitance sensing, the transmitter electrodes are driver electrodes and the receiver electrodes are sensor electrodes. In this example, the upper touch panel electrodes 12 are sensor electrodes and the lower touch panel electrodes 13 are driver electrodes. In self-capacitance sensing, each electrode is a driver electrode and also, a sensor electrode.

The light distribution controller 23 controls the light distribution control panel part 7 of the light distribution controllable touch panel 1 to perform the light distribution control (viewing angle control) function of the light distribution controllable touch panel 1. Specifically, the light distribution controller 23 controls the lower light distribution control electrodes 16 in response to a timing signal. As will be described later, the light distribution controller 23 appropriately controls the distribution (viewing angle) of the light from the display panel 5 that passes through the light distribution controllable touch panel 1 in each of the narrow viewing angle mode and the wide viewing angle mode by driving the lower light distribution control electrodes 16 with reference to the driving potential of the lower touch panel electrodes 13.

The main controller 25 controls the display panel 5, the touch panel controller 21, and the light distribution controller 23. The main controller 25 controls the display panel 5 to display an image. The display panel 5 controls the pixels in accordance with a signal from the main controller 25 to display an image. The main controller 25 acquires information indicating the position of the pointer from the touch panel controller 21 and further, controls the mode (self-capacitance mode/mutual capacitance mode) for touch detection of the touch panel controller 21.

Figure 7:
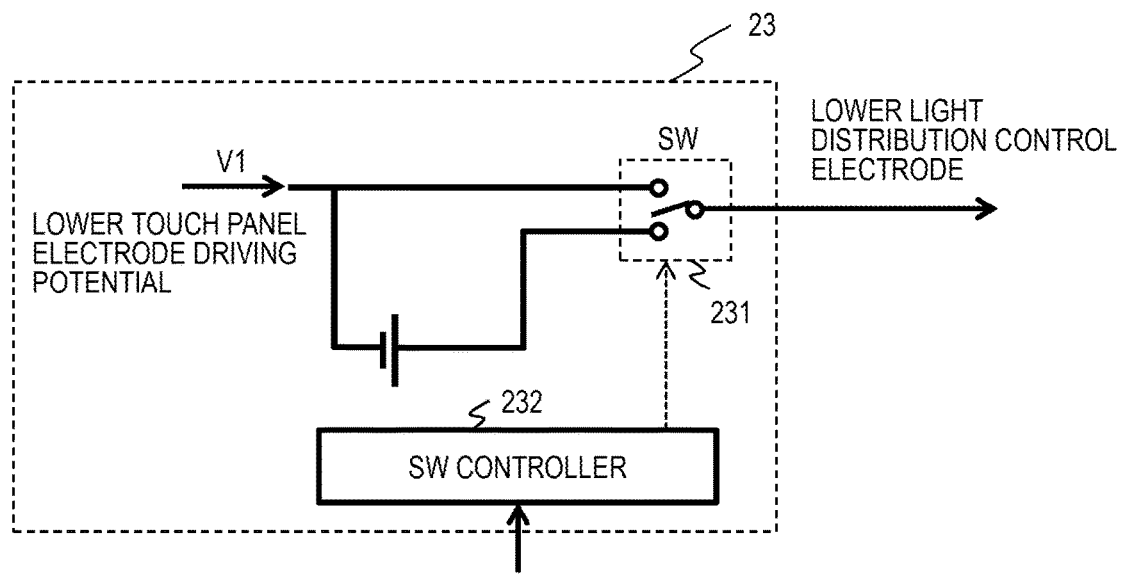
FIG. 7 schematically illustrates a logical configuration example of a part of a light distribution controller.

FIG. 7 schematically illustrates a logical configuration example of a part of the light distribution controller 23. FIG. 7 provides a configuration example; the light distribution controller 23 can have any configuration as far as the same function is implemented. FIG. 7 represents a configuration example for driving one lower light distribution control electrode 16. The light distribution controller 23 includes a switch 231 and a switch controller 232. The switch 231 is connected with a lower light distribution control electrode 16 associated therewith and outputs a signal (potential) for driving the lower light distribution control electrode 16.

The light distribution controller 23 includes switches 231 for driving individual lower light distribution control electrodes 16. The switch controller 232 controls the switches 231 in response to designation of a viewing angle mode from the main controller 25.

A signal having the same potential as the driving potential V1 for the lower touch panel electrode 13 paired with the lower light distribution control electrode 16 is generated within the light distribution controller 23. The switch 231 selects one of the driving potential V1 and the potential increased from the driving potential V1 by a constant voltage (by selecting the line/terminal therefor). Specifically, the switch 231 selects the driving potential V1 in the narrow viewing angle mode and selects the potential increased from the driving potential V1 by the constant voltage in the wide viewing angle mode. The switch 231 is controlled in accordance with the viewing angle mode.

Mutual Capacitance Sensing and Narrow Viewing Angle Mode

Figure 8A:
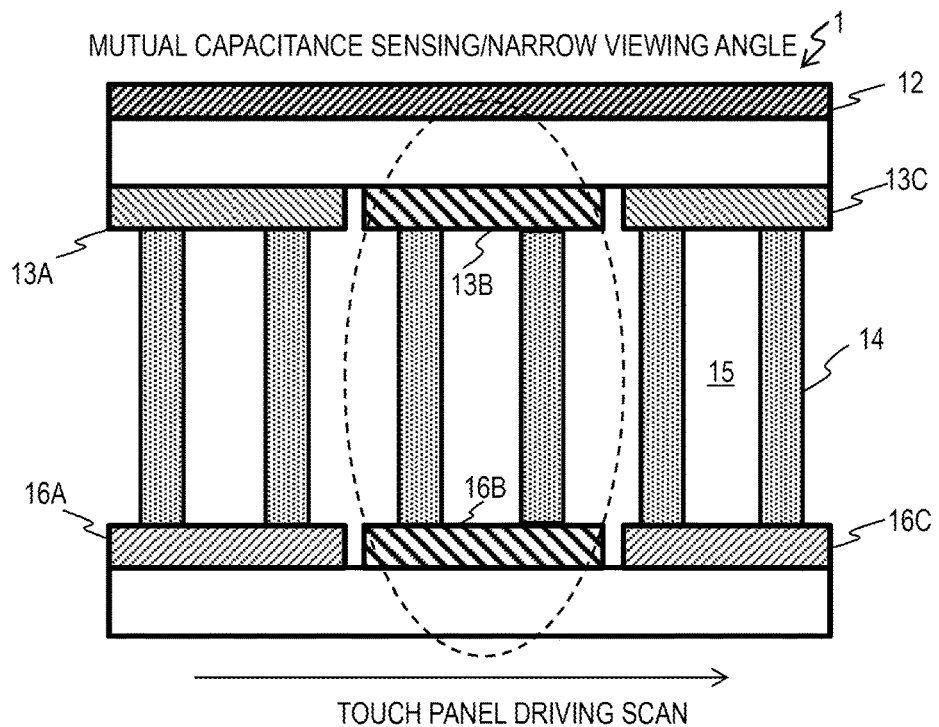
FIG. 8A illustrates a way to drive the electrodes in a mutual capacitive touch sensing and narrow viewing angle mode.
Figure 8B:
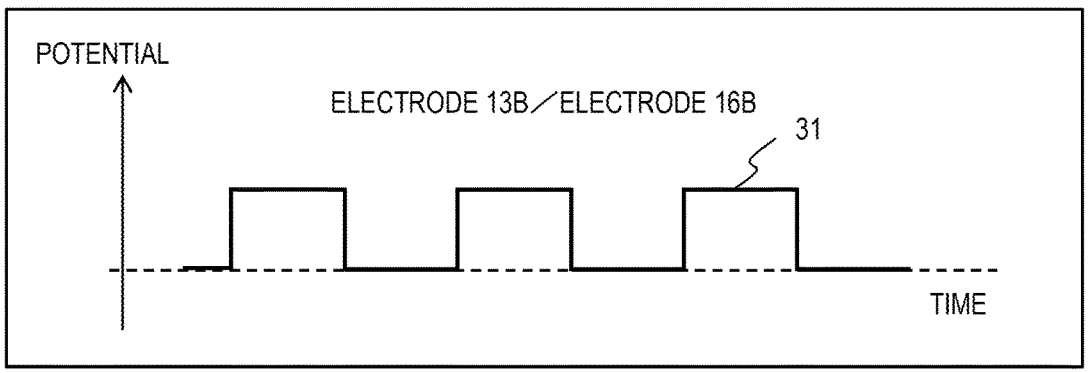
FIG. 8B provides a waveform of the driving potentials given to the lower touch panel electrode selected to measure the capacitance and the opposite lower light distribution control electrode in the mutual capacitive touch sensing and narrow viewing angle mode.
Figure 8C:
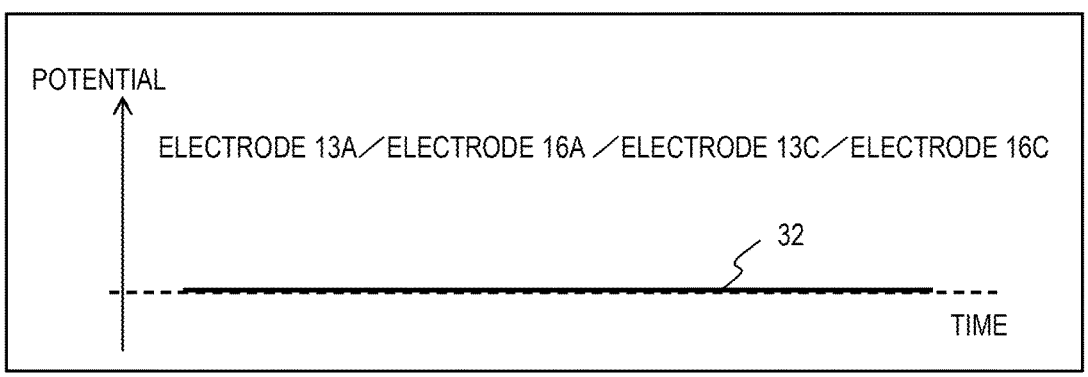
FIG. 8C provides a waveform of the potentials given to the other lower touch panel electrodes and lower light distribution control electrodes in the mutual capacitive touch sensing and narrow viewing angle mode.

FIGS. 8A, 8B, and 8C illustrate a way to drive the electrodes in a mutual capacitive touch sensing and narrow viewing angle mode. The touch panel controller 21 selects the lower touch panel electrodes 13 one by one. The touch panel controller 21 measures the capacitances at the upper touch panel electrodes 12 while applying driving potentials to the selected lower touch panel electrode 13. The touch panel controller 21 may measure the capacitances while selecting the upper touch panel electrodes 12 one by one or measure the capacitances between all upper touch panel electrodes 12 and the selected lower touch panel electrode 1 all together.

In the example illustrated in FIG. 8A, the touch panel controller 21 selects the lower touch panel electrodes 13A, 13B, and 13C in this order. FIG. 8A illustrates a state where the lower touch panel electrode 13B is selected and provided with a driving potential.

FIG. 8B provides a waveform 31 of the driving potentials (driving signals) given to the lower touch panel electrode 13B selected to measure the capacitance and the opposite lower light distribution control electrode 16B. Signals having the same waveform 31 are given to the lower touch panel electrode 13B and the lower light distribution control electrode 16B opposed to each other.

FIG. 8C provides a waveform 32 of the potentials (signals) given to the lower touch panel electrodes 13A and 13C and the lower light distribution control electrodes 16A and 16C. Signals having the same waveform 32 are given to the lower touch panel electrodes 13A and 13C and the lower light distribution control electrodes 16A and 16C.

As illustrated in FIG. 8B, the lower touch panel electrode 13B selected to measure the capacitance is provided with an AC signal. In the example of FIG. 8B, the signal given to the lower touch panel electrode 13B is a rectangular wave. The driving potential to measure the capacitance can have any waveform; a waveform appropriate for the light distribution controllable touch panel 1 to detect a touch is selected.

As illustrated in FIG. 8B and described with reference to FIG. 7, the driving potential given to the lower light distribution control electrode 16B in the narrow viewing angle mode is equal to the driving potential given to the opposite lower touch panel electrode 13B. The both ends of the electrophoretic elements 14 sandwiched between the lower light distribution control electrode 16B and the lower touch panel electrode 13B are at the same potential; the colored electrophoretic particles 140 are substantially uniformly dispersed in the dispersion medium 141.

As illustrated in FIG. 8C and described with reference to FIG. 7, the lower touch panel electrodes 13A and 13C other than the lower touch panel electrode 13B selected to measure the capacitance are given a constant reference potential (for example, the ground potential). The lower light distribution control electrodes 16A and 16C opposed to the lower touch panel electrodes 13A and 13C, respectively, are also given the constant reference potential.

The both ends of the electrophoretic elements 14 sandwiched by the lower light distribution control electrode 16A and the lower touch panel electrode 13A are at the same potential and the both ends of the electrophoretic elements 14 sandwiched by the lower light distribution control electrode 16C and the lower touch panel electrode 13C are at the same potential. That is to say, the both ends of individual electrophoretic elements 14 sandwiched between all lower light distribution control electrodes 16 and all lower touch panel electrodes 13 are at the same potential. Both ends of all electrophoretic elements 14 are at the same potential and the colored electrophoretic particles 140 are substantially uniformly dispersed in the dispersion medium 141.

As described above, the light distribution controller 23 provides the lower light distribution control electrode 16 for an electrophoretic element 14 with the same potential (signal) as the potential for the opposite lower touch panel electrode 13 in the mutual capacitive touch sensing and narrow viewing angle mode. As a result, the colored electrophoretic particles 140 in the electrophoretic element 14 are maintained in the state substantially uniformly dispersed in the dispersion medium 141.

Mutual Capacitance Sensing and Wide Viewing Angle Mode

Figure 9A:
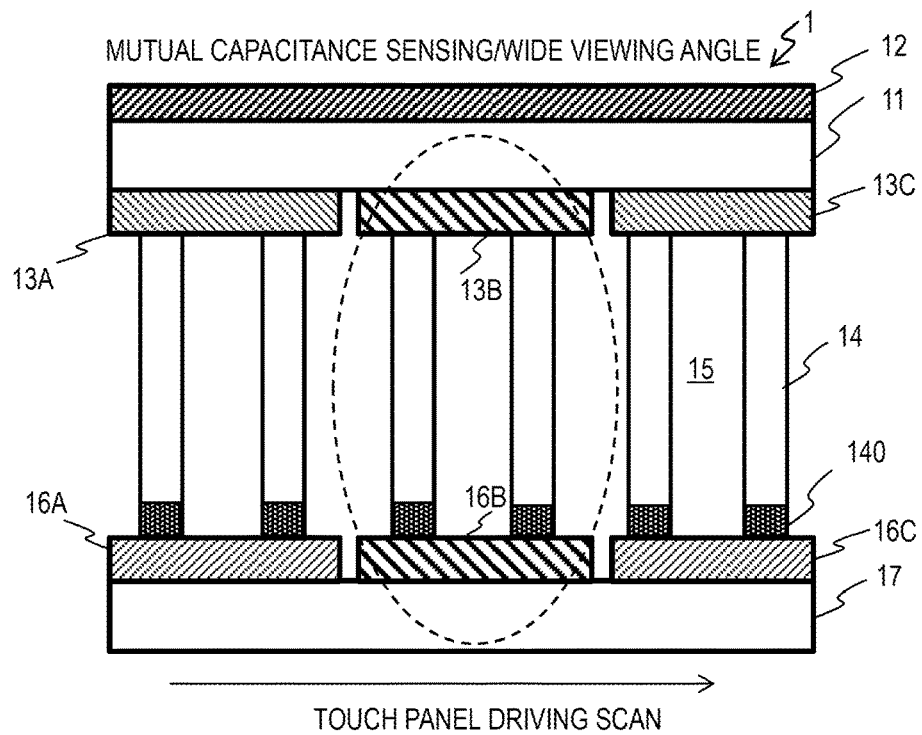
FIG. 9A illustrates a way to drive the electrodes in a mutual capacitive touch sensing and wide viewing angle mode.
Figure 9B:
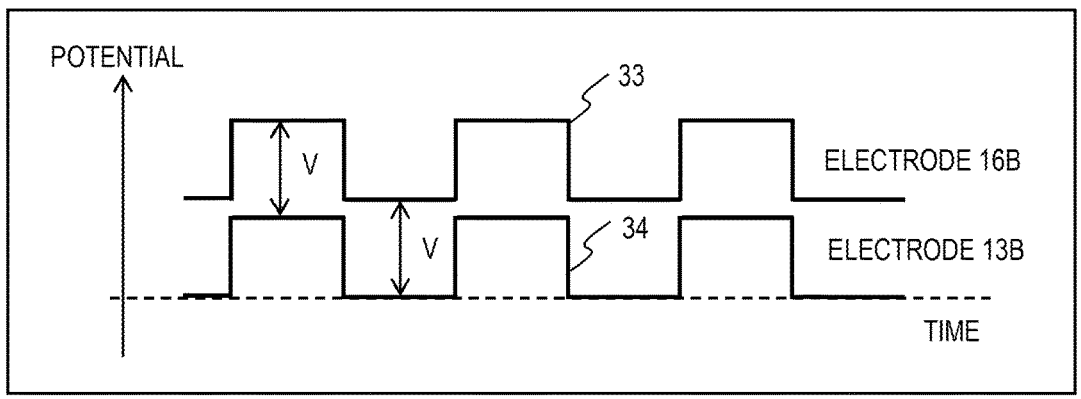
FIG. 9B provides a waveform of the driving potential given to the lower touch panel electrode selected to measure the capacitance and a waveform of the driving potential given to the opposite lower light distribution control electrode in the mutual capacitive touch sensing and wide viewing angle mode.
Figure 9C:
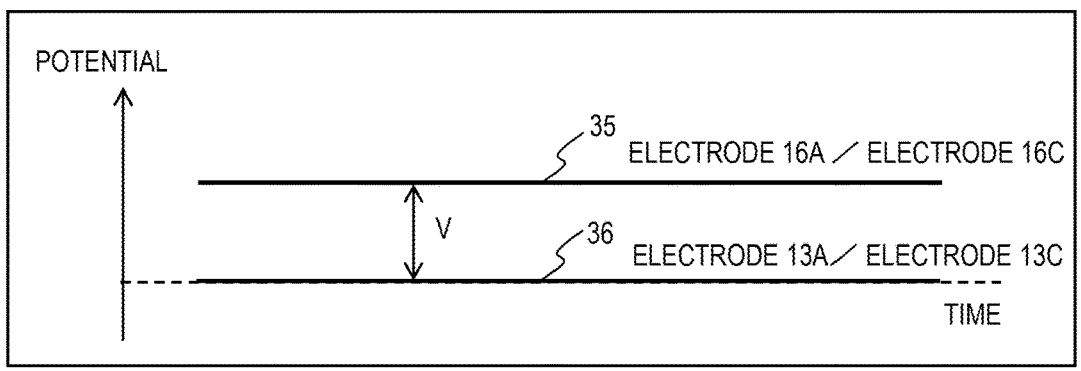
FIG. 9C provides a waveform of the potentials given to the other lower touch panel electrodes and a waveform of the potentials given to the opposite lower light distribution control electrodes in the mutual capacitive touch sensing and wide viewing angle mode.

FIGS. 9A, 9B, and 9C illustrate a way to drive the electrodes in a mutual capacitive touch sensing and wide viewing angle mode. The wide viewing field state is achieved by collecting the electrophoretic particles 140 to the proximity of one of the electrodes sandwiching an electrophoretic element 14, which is the lower light distribution control electrode 16 in this example. The electrophoretic particles 140 may be collected to the proximity of the lower touch panel electrode 13.

In the example illustrated in FIG. 9A, the touch panel controller 21 selects the lower touch panel electrodes 13A, 13B, and 13C in this order. FIG. 9A illustrates a state where the lower touch panel electrode 13B is selected and provided with a driving potential.

FIG. 9B provides a waveform 34 of the driving potential (driving signal) given to the lower touch panel electrode 13B selected to measure the capacitance and a waveform 33 of the driving potential (driving signal) given to the opposite lower light distribution control electrode 16B. There is a predetermined potential difference V between these driving potentials.

FIG. 9C provides a waveform 36 of the potentials (signals) given to the lower touch panel electrodes 13A and 13C and a waveform 35 of the potentials (signals) given to the lower light distribution control electrodes 16A and 16C. There is a predetermined potential difference V between these potentials.

As illustrated in FIG. 9B, the lower touch panel electrode 13B selected to measure the capacitance is provided with an AC signal. In the example of FIG. 9B, the signal given to the lower touch panel electrode 13B is a rectangular wave.

As illustrated in FIG. 9B and described with reference to FIG. 7, the driving potential given to the lower light distribution control electrode 16B in the wide viewing angle mode is a potential increased from the driving potential given to the lower touch panel electrode 13B by a predetermined voltage (predetermined potential difference) V.

The voltage V is applied across the both ends of each electrophoretic element 14 sandwiched by the lower light distribution control electrode 16B and the lower touch panel electrode 13B and the polarity of the lower light distribution control electrode 16B is positive with respect to the lower touch panel electrode 13B. Accordingly, the negatively charged colored electrophoretic particles 140 are collected to the proximity of the lower light distribution control electrode 16B.

As illustrated in FIG. 9C and described with reference to FIG. 7, the lower touch panel electrodes 13A and 13C other than the lower touch panel electrode 13B selected to measure the capacitance are given a constant reference potential (for example, the ground potential). The lower light distribution control electrodes 16A and 16C opposed to the lower touch panel electrodes 13A and 13C are given a potential increased from the potential given to the lower touch panel electrodes 13A and 13C by a predetermined voltage V.

The voltage V is applied to the electrophoretic elements 14 sandwiched by the lower light distribution control electrode 16A and the lower touch panel electrode 13A and the relative polarity of the lower light distribution control electrode 16A is positive. The voltage V is also applied to the electrophoretic elements 14 sandwiched by the lower light distribution control electrode 16C and the lower touch panel electrode 13C and the relative polarity of the lower light distribution control electrode 16C is positive.

That is to say, the potential differences across the both ends of the electrophoretic elements 14 sandwiched by all lower light distribution control electrodes 16 and all lower touch panel electrodes 13 are V and the relative polarity of the lower light distribution control electrodes 16 is positive. The colored electrophoretic particles 140 are collected to the proximity of the lower light distribution control electrodes 16.

As described above, the light distribution controller 23 provides the lower light distribution control electrodes 16 of the electrophoretic elements 14 with potentials increased from the potentials (signals) for the opposite lower touch panel electrodes 13 by a predetermined voltage in the mutual capacitive touch sensing and wide viewing angle mode. As a result, the colored electrophoretic particles 140 in each electrophoretic element 14 are maintained in the state collected at the proximity of the lower light distribution control electrode 16.

Self-Capacitance Sensing and Narrow Viewing Angle Mode

Figure 10A:
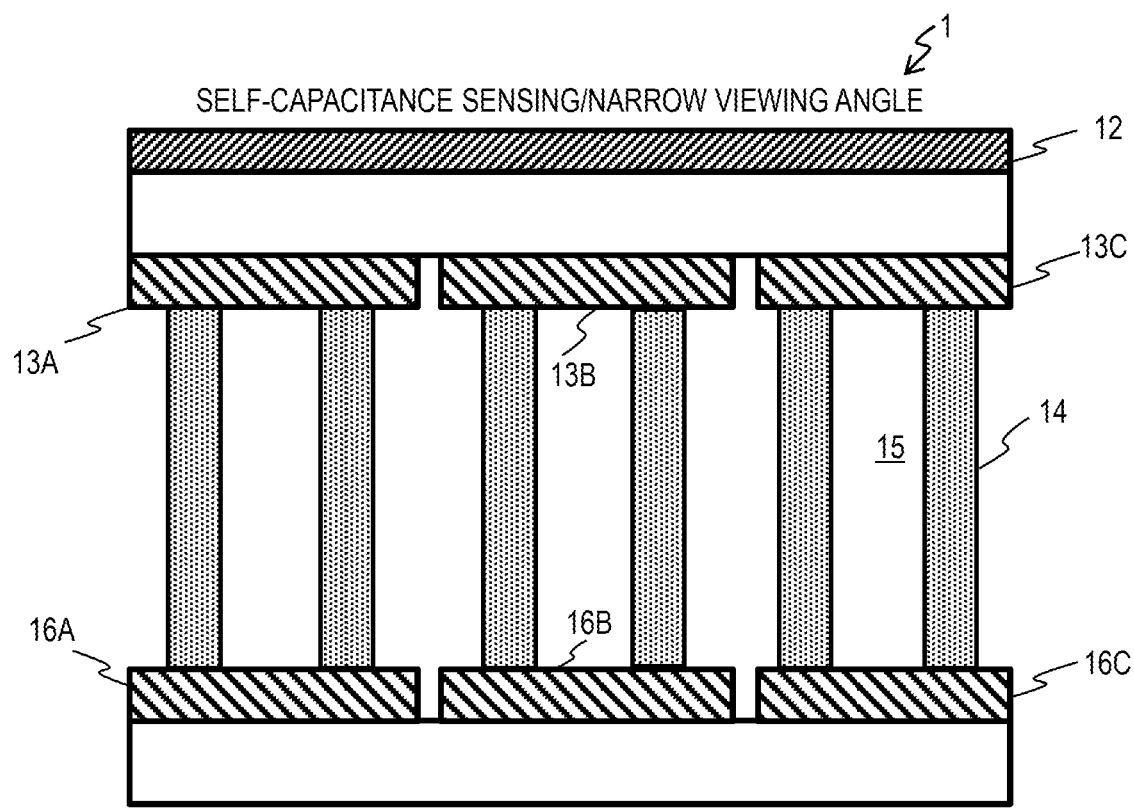
FIG. 10A illustrates a way to drive the electrodes in a self-capacitive touch sensing and narrow viewing angle mode.
Figure 10B:
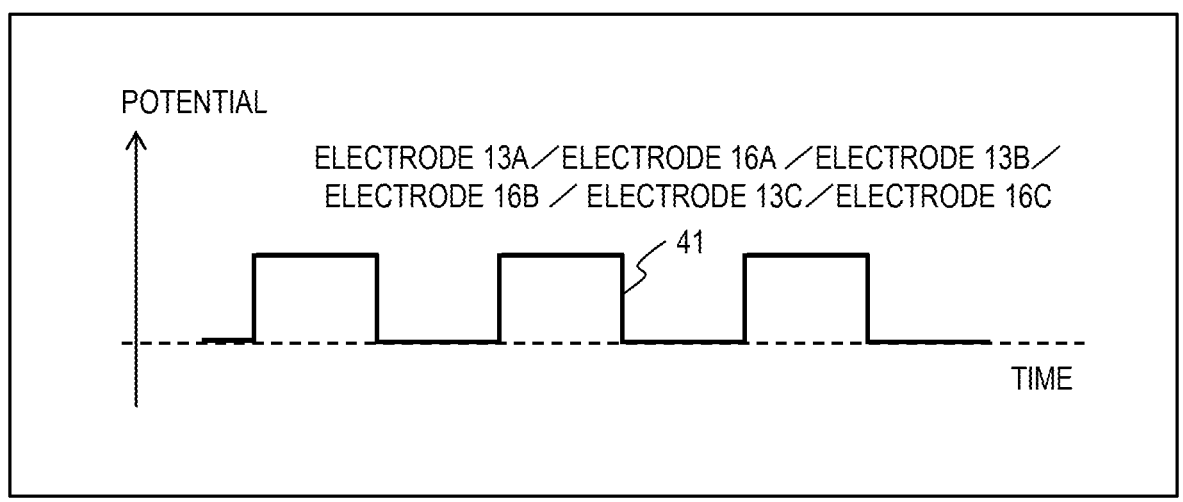
FIG. 10B provides a waveform of the potentials given to the lower touch panel electrodes and the lower light distribution control electrodes in the self-capacitive touch sensing and narrow viewing angle mode.

FIGS. 10A and 10B illustrate a way to drive the electrodes in a self-capacitive touch sensing and narrow viewing angle mode. The touch panel controller 21 measures the capacitances of all upper touch panel electrodes and all lower touch panel electrodes 13 while providing driving potentials to all upper touch panel electrodes 12 and all lower touch panel electrodes 13. Unlike this configuration, the touch panel controller 21 selects the upper touch panel electrodes 12 and the lower touch panel electrodes 13 in turn and provides driving signals to the selected electrodes to measure their capacitances.

In the example illustrated in FIG. 10A, the touch panel controller 21 applies driving potentials to all the lower touch panel electrodes 13A, 13B, and 13C simultaneously. FIG. 10B provides a waveform 41 of the potentials (signals) given to the lower touch panel electrodes 13A, 13B, and 13C and the lower light distribution control electrodes 16A, 16B, and 16C.

Driving signals having the same waveform 41 are provided to the lower touch panel electrodes 13A, 13B, and 13C and the lower light distribution control electrodes 16A, 16B, and 16C. The driving signal to measure the capacitance can have any waveform; a waveform appropriate for the light distribution controllable touch panel 1 to detect a touch is selected.

As illustrated in FIG. 10B and described with reference to FIG. 7, the driving potentials given to the lower light distribution control electrodes 16A, 16B, and 16C in the narrow viewing angle mode are equal to the driving potentials given to the opposite lower touch panel electrode 13A, 13B, and 13C.

In this example, the both ends of individual electrophoretic elements 14 sandwiched between all lower light distribution control electrodes 16 and all lower touch panel electrodes 13 are at the same potential. The both ends of all electrophoretic elements 14 are at the same potential and the colored electrophoretic particles 140 are substantially uniformly dispersed in the dispersion medium 141 (dispersed state).

As described above, the light distribution controller 23 provides the lower light distribution control electrode 16 for an electrophoretic element 14 with the same potential (signal) as the potential for the opposite lower touch panel electrode 13 in the self-capacitive touch sensing and narrow viewing angle mode. As a result, the colored electrophoretic particles 140 in the electrophoretic element 14 are maintained in the state substantially uniformly dispersed in the dispersion medium 141.

Self-Capacitance Sensing in Wide Viewing Angle Mode

Figure 11A:
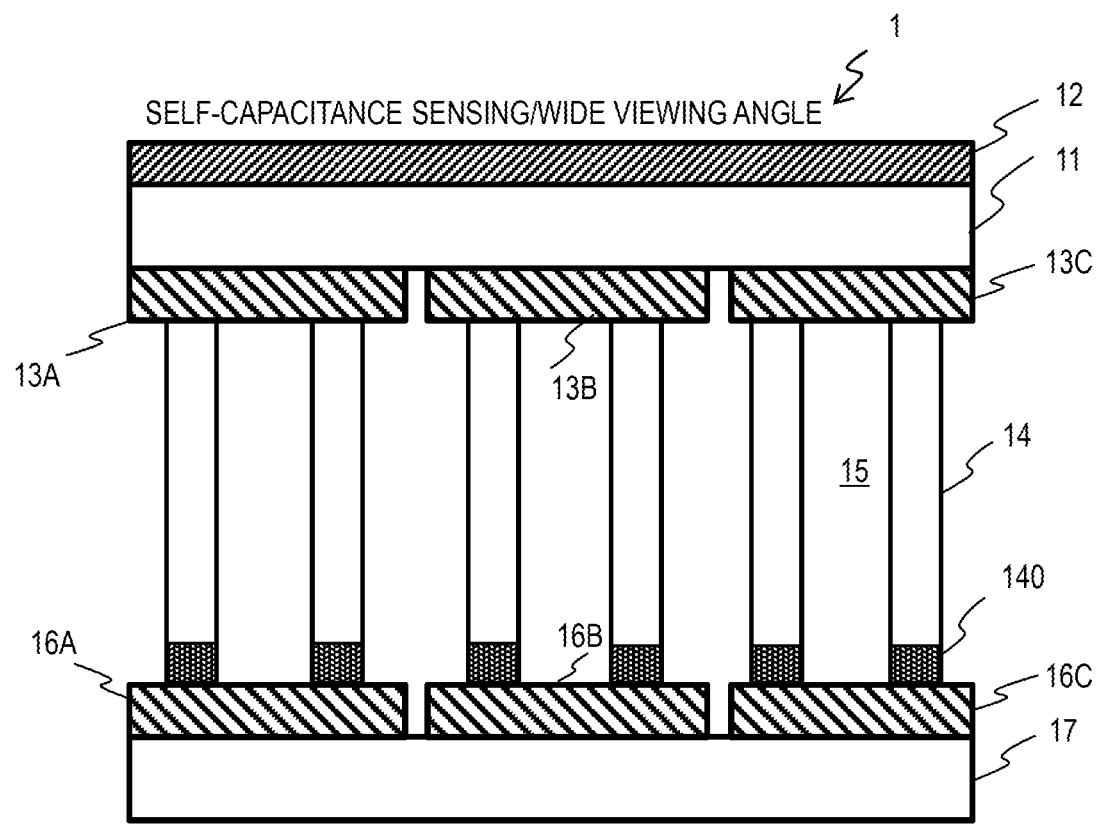
FIG. 11A illustrates a way to drive the electrodes in a self-capacitive touch sensing and wide viewing angle mode.
Figure 11B:
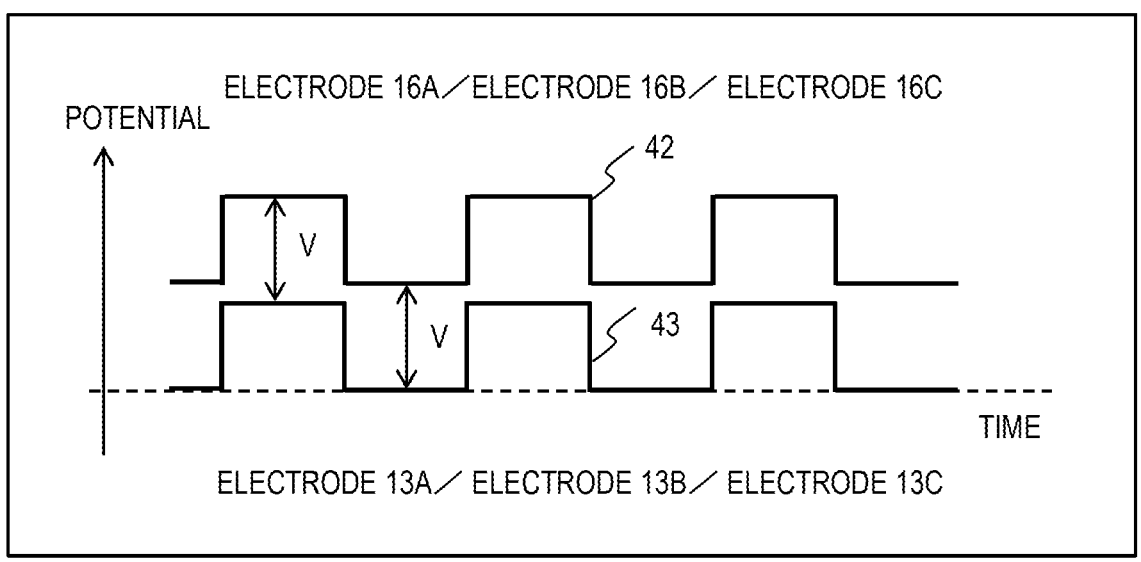
FIG. 11B provides a waveform of the driving potentials given to all lower touch panel electrodes to measure the capacitances and a waveform of the driving potentials given to the opposite lower light distribution control electrodes in the self-capacitive touch sensing and wide viewing angle mode.

FIGS. 11A and 11B illustrate a way to drive the electrodes in a self-capacitive touch sensing and wide viewing angle mode. The wide viewing field state is achieved by collecting the electrophoretic particles 140 to the proximity of one of the electrodes sandwiching the electrophoretic element 14, which is the lower light distribution control electrode 16 in this example.

In the example illustrated in FIG. 11A, the touch panel controller 21 provides driving potentials to all the lower touch panel electrodes 13A, 13B, and 13C simultaneously. FIG. 11B provides a waveform 43 of the driving potentials (driving signals) given to the lower touch panel electrodes 13A, 13B, and 13C and a waveform 42 of the driving potentials (driving signals) given to the lower light distribution control electrodes 16A, 16B, and 16C. There is a predetermined potential difference V between these driving potentials.

As illustrated in FIG. 11B, all lower touch panel electrodes 13A, 13B, and 13C are provided with an AC signal to measure the capacitance. In the example of FIG. 11B, the signals given to the lower touch panel electrodes 13A, 13B, and 13C are rectangular waves.

As illustrated in FIG. 11B and described with reference to FIG. 7, the driving potentials provided to the lower light distribution control electrodes 16A, 16B, and 16C in the wide viewing angle mode are a potential increased from the potential given to the lower touch panel electrodes 13A, 13B, and 13C by a predetermined voltage V.

The voltage V is applied to the electrophoretic elements 14 sandwiched by the lower light distribution control electrode 16A and the lower touch panel electrode 13A and the relative polarity of the lower light distribution control electrode 16A is positive. The voltage V is also applied to the electrophoretic elements 14 sandwiched by the lower light distribution control electrode 16B and the lower touch panel electrode 13B and the relative polarity of the lower light distribution control electrode 16C is positive. Furthermore, the voltage V is applied to the electrophoretic elements 14 sandwiched by the lower light distribution control electrode 16C and the lower touch panel electrode 13C and the relative polarity of the lower light distribution control electrode 16C is positive.

That is to say, the potential differences across the both ends of the electrophoretic elements 14 sandwiched by all lower light distribution control electrodes 16 and all lower touch panel electrodes 13 are V and the relative polarity of the lower light distribution control electrodes 16 is positive. The colored electrophoretic particles 140 are collected to the proximity of the lower light distribution control electrodes 16 (collected state).

As described above, the light distribution controller 23 provides the lower light distribution control electrodes 16 of the electrophoretic elements 14 with potentials increased from the potentials (signals) for the opposite lower touch panel electrodes 13 by a predetermined voltage in the self-capacitive touch sensing and wide viewing angle mode. As a result, the colored electrophoretic particles 140 in each electrophoretic element 14 are maintained in the state collected at the proximity of the lower light distribution control electrode 16.

In the configuration example described with reference to FIGS. 8A to 11B, each lower touch panel electrode 13 is opposed to only one lower light distribution control electrode 16 and each lower light distribution control electrode 16 is opposed to only one lower touch panel electrode 13. The light distribution controllable touch panel 1 may have a different configuration from this configuration.

As described above, the light distribution controller 23 provides each lower light distribution control electrode 16 with a potential equal to the potential for the opposite lower touch panel electrode 13 in the narrow viewing angle mode in both mutual capacitive touch sensing and self-capacitive touch sensing. The light distribution controller 23 provides each lower light distribution control electrode 16 with a potential increased from the potential for the opposite lower touch panel electrode 13 by a predetermined voltage in the wide viewing angle mode in both mutual capacitive touch sensing and self-capacitive touch sensing.

The lower touch panel electrodes 13 and the lower light distribution control electrodes 16 may have various shapes that allow the above-described operation. For example, in the configuration described with reference to FIGS. 8A to 9C where the lower touch panel electrodes 13 to be driven are selected one by one, each lower light distribution control electrode 16 may be opposed to only one lower touch panel electrode 13 and each lower touch panel electrode 13 may be opposed to a plurality of lower light distribution control electrodes 16.

All electrophoretic elements 14 opposed to a lower light distribution control electrode 16 are opposed to only one lower touch panel electrode 13. The plurality of successive electrophoretic elements 14 are sandwiched by one lower touch panel electrode 13 and a plurality of lower light distribution control electrodes 16 and driven by those electrodes.

In the configuration described with reference to FIGS. 10A to 11B where all lower touch panel electrodes 13 are driven together, the lower light distribution control electrodes 16 can be of any number and any shape. The number of lower touch panel electrodes 13 opposed to each lower light distribution control electrode 16 can be any number and the number of lower light distribution control electrodes 16 opposed to each lower touch panel electrode 13 can be any number. For example, the lower light distribution control electrode 16 is a solid filling; all electrophoretic elements 14 may be sandwiched by the single lower light distribution control electrode 16 and a plurality of lower touch panel electrodes 13.

In another configuration example, the upper touch panel electrodes 12 may be provided on the underface of the upper transparent substrate 11. For example, the upper touch panel electrodes 12 are provided between the underface of the upper transparent substrate 11 and the lower touch panel electrodes 13. Between the upper touch panel electrodes 12 and the lower touch panel electrodes 13, an insulating layer such as a silicon oxide layer or a silicon nitride layer is provided.

Other Embodiments

Hereinafter, another configuration of the light distribution controllable touch panel 1 is described. In the configuration described in the following, the upper touch panel electrodes 12 and the lower touch panel electrodes 13 are configured so that a plurality of electrode pieces are chained.

Figure 12A:
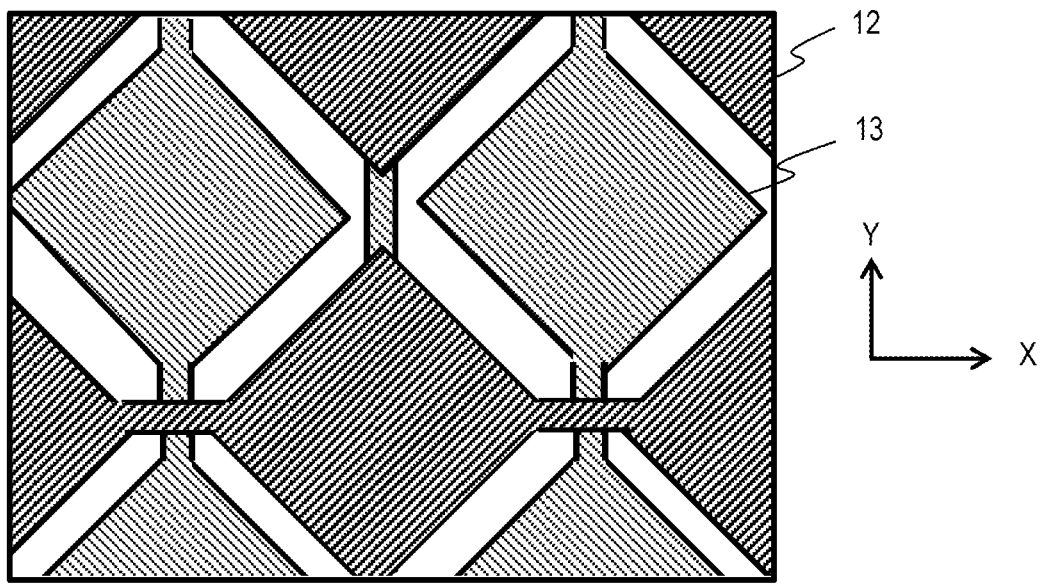
FIG. 12A illustrates patterns of upper touch panel electrodes and lower touch panel electrodes on an upper transparent substrate.
Figure 12B:
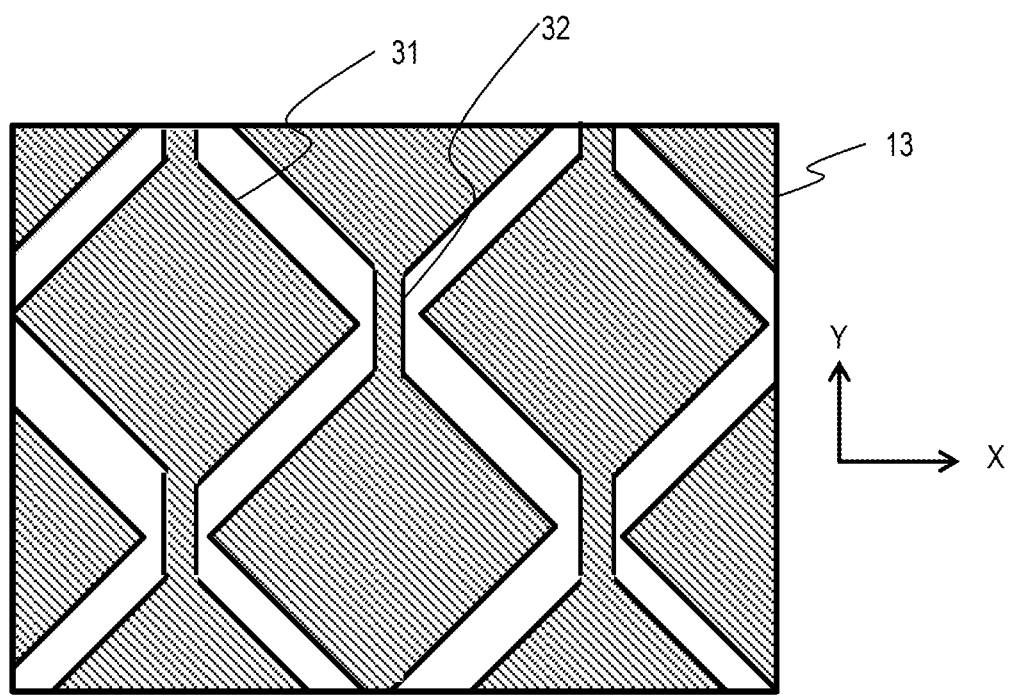
FIG. 12B illustrates the pattern of the lower touch panel electrodes on the upper transparent substrate.

FIG. 12A illustrates patterns of the upper touch panel electrodes 12 and the lower touch panel electrodes 13 on the upper transparent substrate 11; FIG. 12B illustrates the pattern of the lower touch panel electrodes 13 on the upper transparent substrate 11; and FIG. 12C illustrates the pattern of the upper touch panel electrodes 12 on the upper transparent substrate 11.

As illustrated in FIG. 12B, the lower touch panel electrodes 13 have a diamond pattern. Specifically, each lower touch panel electrode 13 consists of a plurality of rhombic electrode pieces 31 disposed in the Y-axis direction and connectors 32 connecting the corners of the rhombic electrode pieces 31.

The lower touch panel electrodes 13 are disposed to be staggered in the X-axis direction. Between adjacent electrode pieces 31 of a lower touch panel electrode 13, an electrode piece 31 of the adjacent lower touch panel electrode 13 is located on each side. The electrode pieces 31 of all lower touch panel electrodes 13 are staggered on the underface of the upper transparent substrate 11.

Figure 12C:
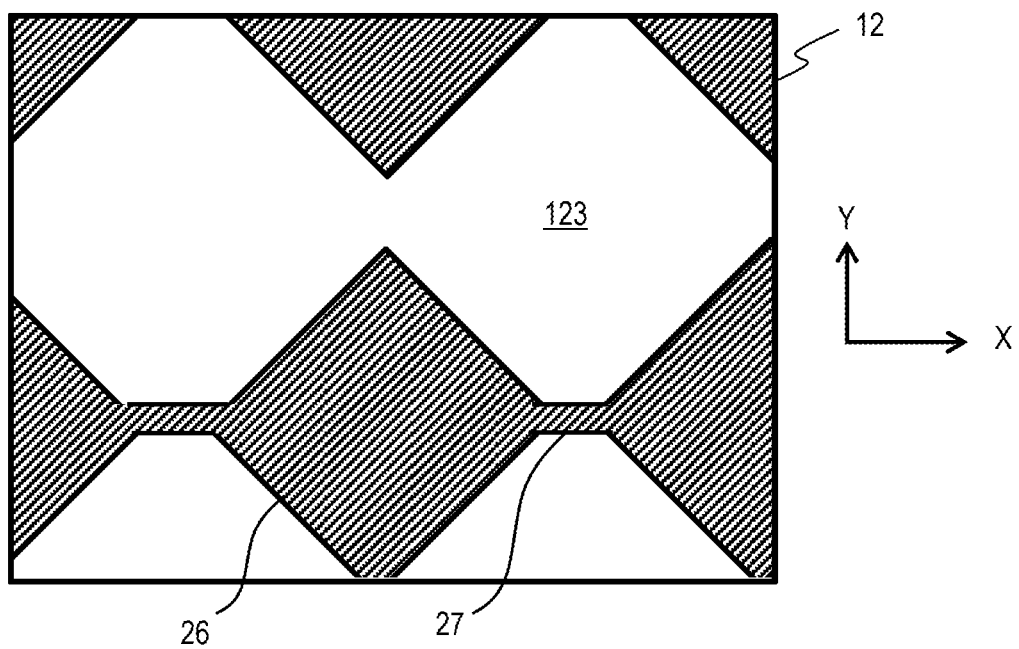
FIG. 12C illustrates the pattern of the upper touch panel electrodes on the upper transparent substrate.

As illustrated in FIG. 12C, the upper touch panel electrodes 12 have a diamond pattern. Specifically, each upper touch panel electrode 12 consists of a plurality of rhombic electrode pieces 26 disposed in the X-axis direction and connectors 27 connecting the corners of the rhombic electrode pieces 26.

The upper touch panel electrodes 12 are disposed to be side by side in the Y-axis direction. The locations of the electrode pieces 26 along the X-axis direction are common to all upper touch panel electrodes 12. The electrode pieces 26 of all upper touch panel electrodes 12 are arrayed in a matrix on the top face of the upper transparent substrate 11. Between adjacent upper touch panel electrodes 12, spaces 123 corresponding to electrode pieces 26 exist.

As illustrated in FIG. 12A, the electrode pieces 26 of all upper touch panel electrodes 12 are substantially superposed on the electrode pieces 31 of the lower touch panel electrodes 13 in the Z-axis direction. When seen in the Z-axis direction, a part of the electrode pieces 31 of a lower touch panel electrode 13 are located within the spaces 123 between upper touch panel electrodes 12 without overlapping with any electrode pieces 26 of the upper touch panel electrodes 12.

The electrode pieces 31 of all lower touch panel electrodes 13 covers larger area of the upper transparent substrate 11 than the electrode pieces 26 of all upper touch panel electrodes 12. The electrode pieces 31 of the lower touch panel electrodes 13 are arrayed to cover larger area of the electrophoretic elements 14.

Figure 13B:
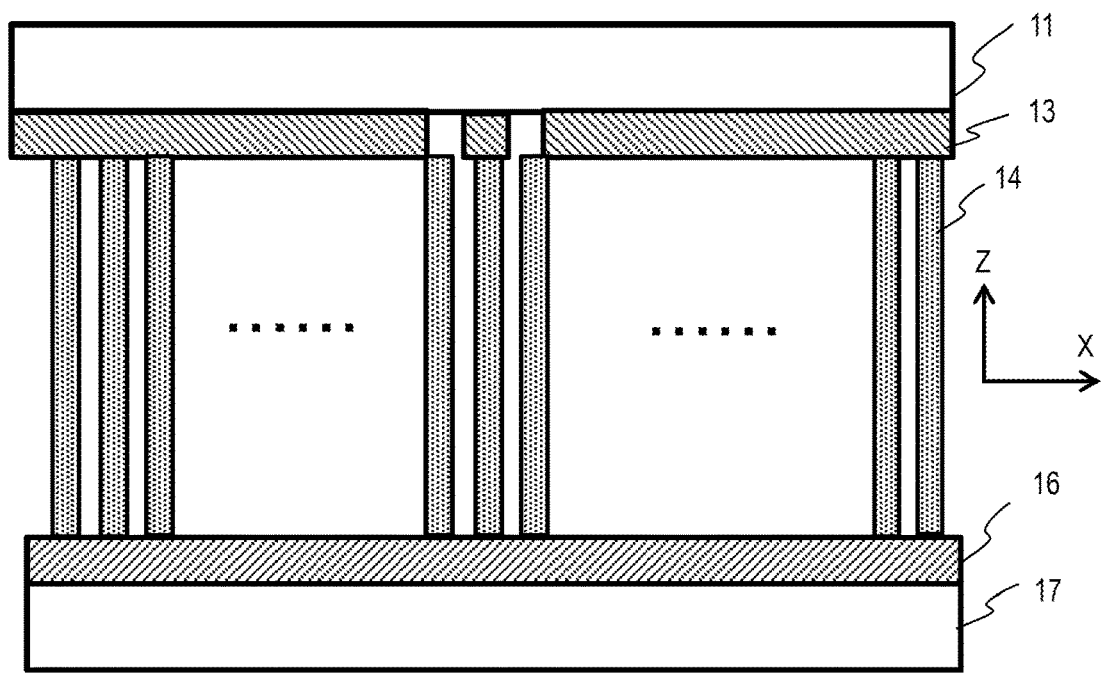
FIG. 13B illustrates a cross-sectional structure of the light distribution controllable touch panel cut along the line B-B in FIG. 13A.
Figure 13C:
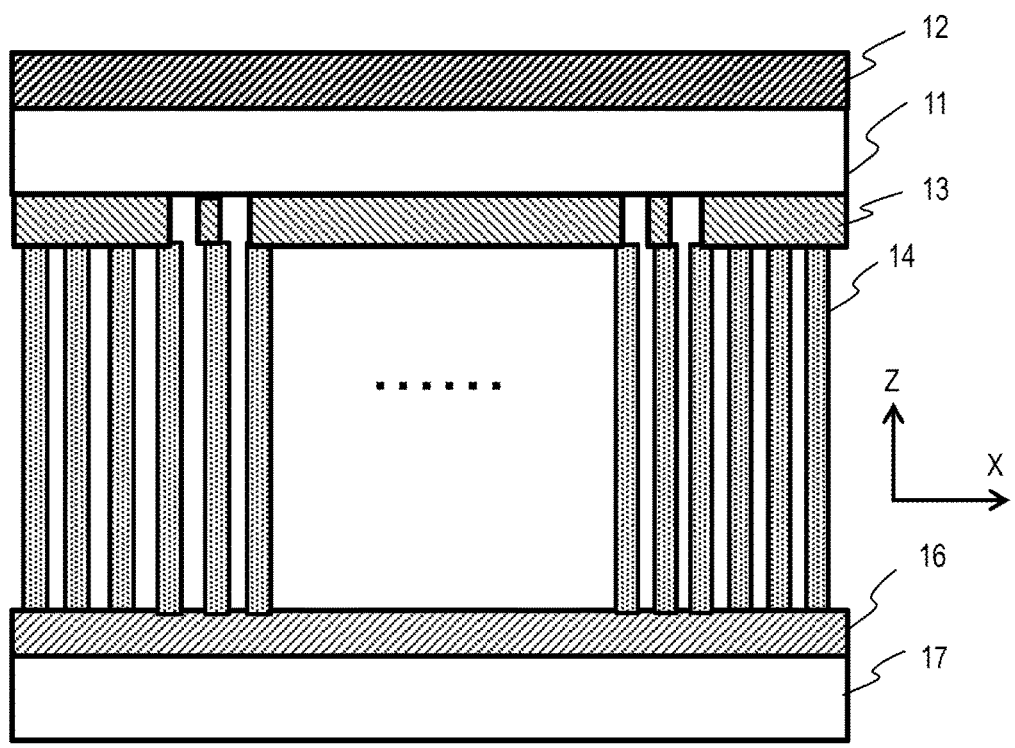
FIG. 13C illustrates a cross-sectional structure of the light distribution controllable touch panel cut along the line C-C in FIG. 13A.
Figure 13D:
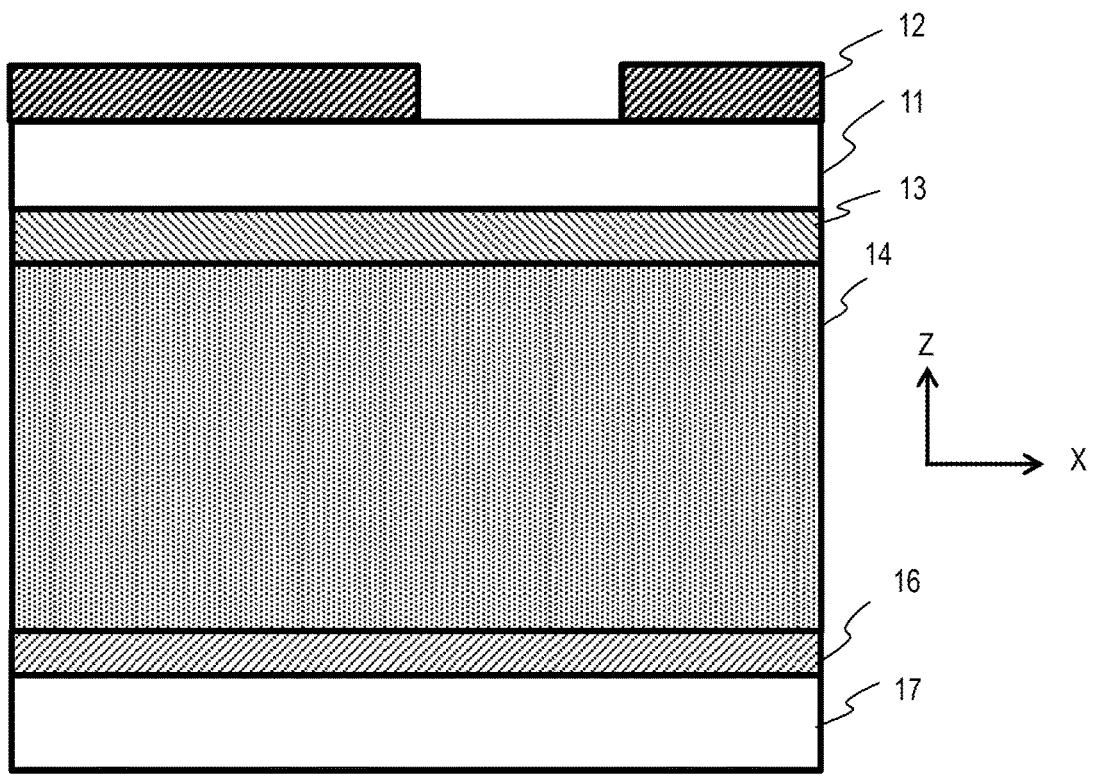
FIG. 13D illustrates a cross-sectional structure of the light distribution controllable touch panel cut along the line D-D in FIG. 13A.
Figure 13E:
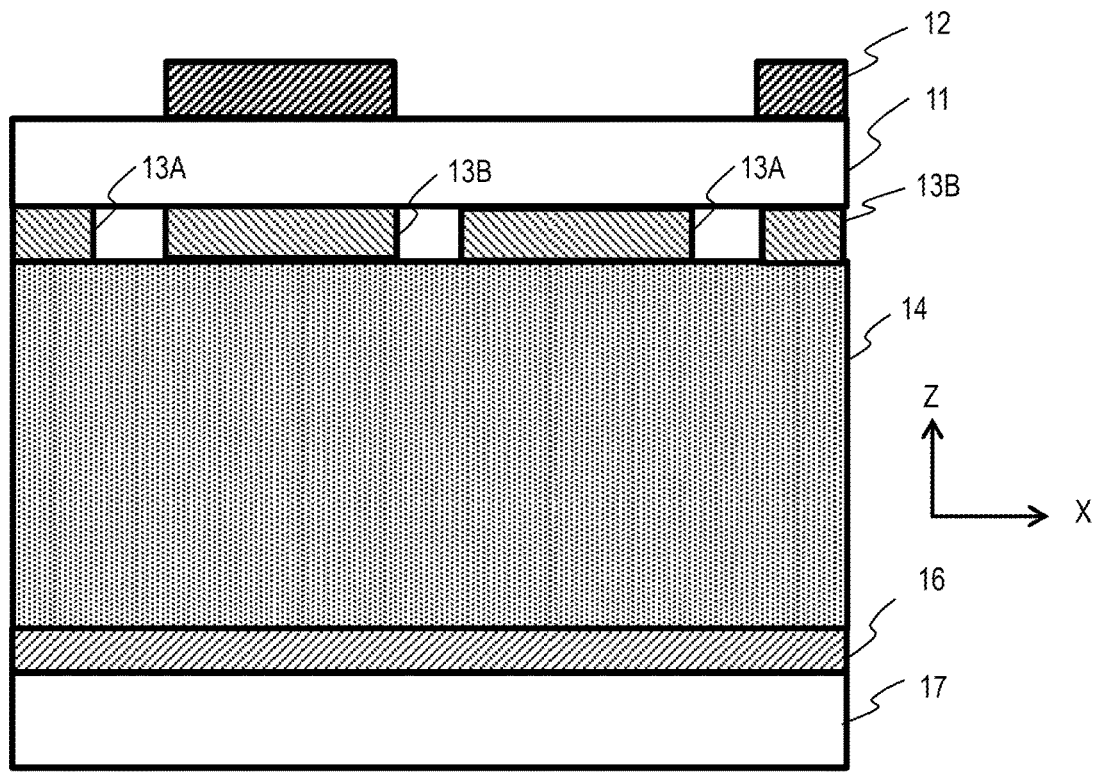
FIG. 13E illustrates a cross-sectional structure of the light distribution controllable touch panel cut along the line E-E in FIG. 13A.

FIG. 13A illustrates electrophoretic elements 14, and the patterns of the upper touch panel electrodes 12 and the lower touch panel electrodes 13 on the upper transparent substrate 11. FIG. 13B illustrates a cross-sectional structure of the light distribution controllable touch panel 1 cut along the line B-B in FIG. 13A. FIG. 13C illustrates a cross-sectional structure of the light distribution controllable touch panel 1 cut along the line C-C in FIG. 13A. FIG. 13D illustrates a cross-sectional structure of the light distribution controllable touch panel 1 cut along the line D-D in FIG. 13A. FIG. 13E illustrates a cross-sectional structure of the light distribution controllable touch panel 1 cut along the line E-E in FIG. 13A.

As illustrated in FIGS. 13B to 13E, the lower light distribution control electrodes 16 are a solid pattern provided on the lower transparent substrate 17, that is, one continuous transparent electrode. The touch panel controller 21 performs self-capacitive touch sensing as described with reference to FIGS. 10A to 11B.

In this example, the touch panel controller 21 simultaneously provides driving potentials having the same waveform to all upper touch panel electrodes 12 and all lower touch panel electrode 13 together to measure the capacitances. The touch panel controller 21 measures or does not measure the capacitances of the lower touch panel electrodes 13 having electrode pieces covered by electrode pieces of upper touch panel electrodes 12.

The light distribution controller 23 drives the lower light distribution control electrode 16 with reference to the driving potential for all the upper touch panel electrodes 12 and all the lower touch panel electrodes 13. As described in the first embodiment, the light distribution controller 23 provides a potential equal to the potential given to the touch panel electrodes to the lower light distribution control electrode 16 in the narrow viewing angle mode. The light distribution controller 23 provides a potential increased from the potential given to the touch panel electrodes by a predetermined voltage to the lower light distribution control electrode 16 in the wide viewing angle mode.

Another configuration example includes a plurality of lower light distribution control electrodes 16 and selects the lower touch panel electrodes 13 one by one to drive in self-capacitance sensing or mutual capacitance sensing. In the example of FIG. 13E, the electrophoretic element 14 is opposed to two lower touch panel electrodes 13A and 13B (the electrode pieces thereof). As noted from this, a part of the electrophoretic elements 14 are opposed to two lower touch panel electrodes 13 (the electrode pieces thereof).

In an example, lower light distribution control electrodes 16 having the pattern identical to the pattern of the lower touch panel electrodes 13 may be provided in the region sandwiching electrophoretic elements 14. The light distribution controller 23 drives the lower light distribution control electrodes 16 with reference to the potentials of the opposite lower touch panel electrodes 13 as described with reference to FIGS. 8A to 11B. In the narrow viewing angle mode, the light distribution controller 23 provides each lower light distribution control electrode 16 with a potential equal to the potential for the opposite lower touch panel electrode 13. In the wide viewing angle mode, the light distribution controller 23 provides each lower light distribution control electrodes 16 with a potential increased from the potentials for the opposite lower touch panel electrode 13 by a predetermined voltage.

The touch panel controller 21 provides or does not provide the driving potential for capacitive sensing to the lower touch panel electrodes 13 having electrode pieces covered by electrode pieces of upper touch panel electrodes 12. In other words, the touch panel controller 21 may select all lower touch panel electrodes 13 one by one or select only the lower touch panel electrodes 13 having electrode pieces exposed between upper touch panel electrodes 12 (electrode pieces not covered by upper touch panel electrodes 12) when seen in the Z-axis direction one by one.

Figure 14A:
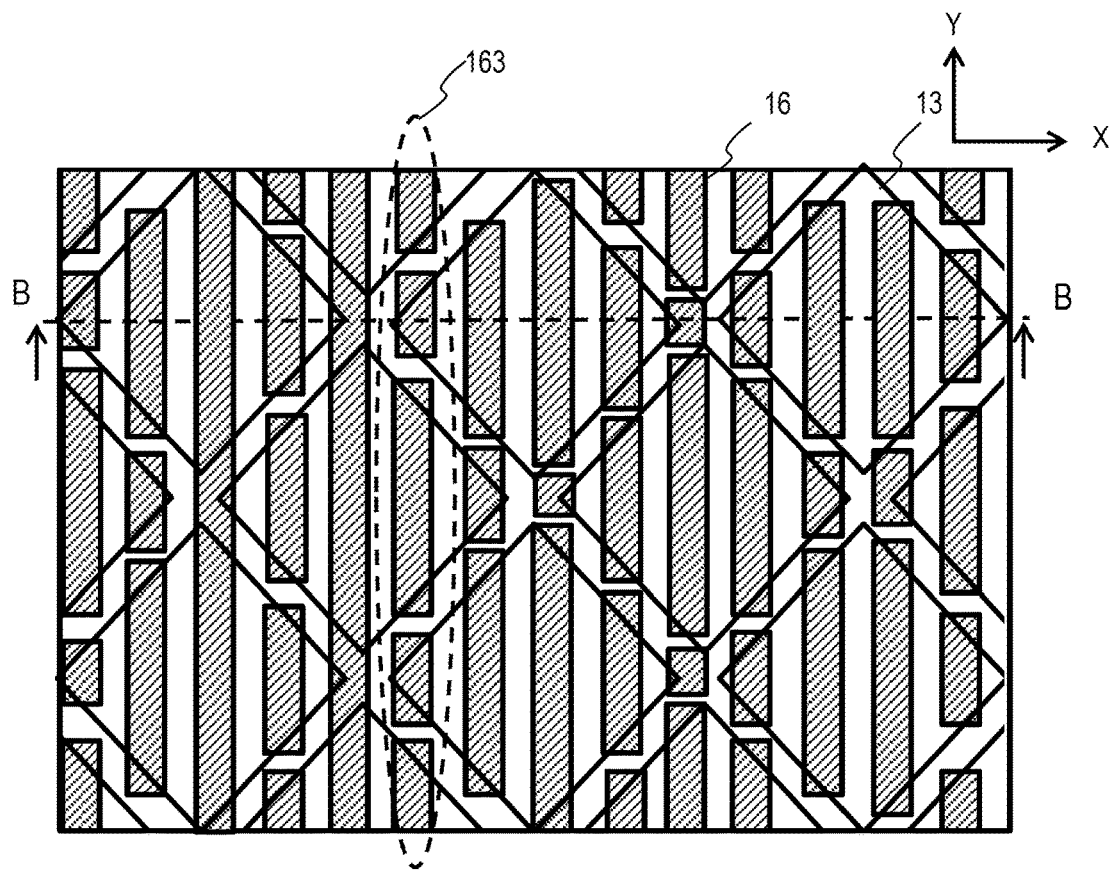
FIG. 14A is a plan diagram for illustrating a relationship between lower touch panel electrodes and lower light distribution control electrodes.
Figure 14B:
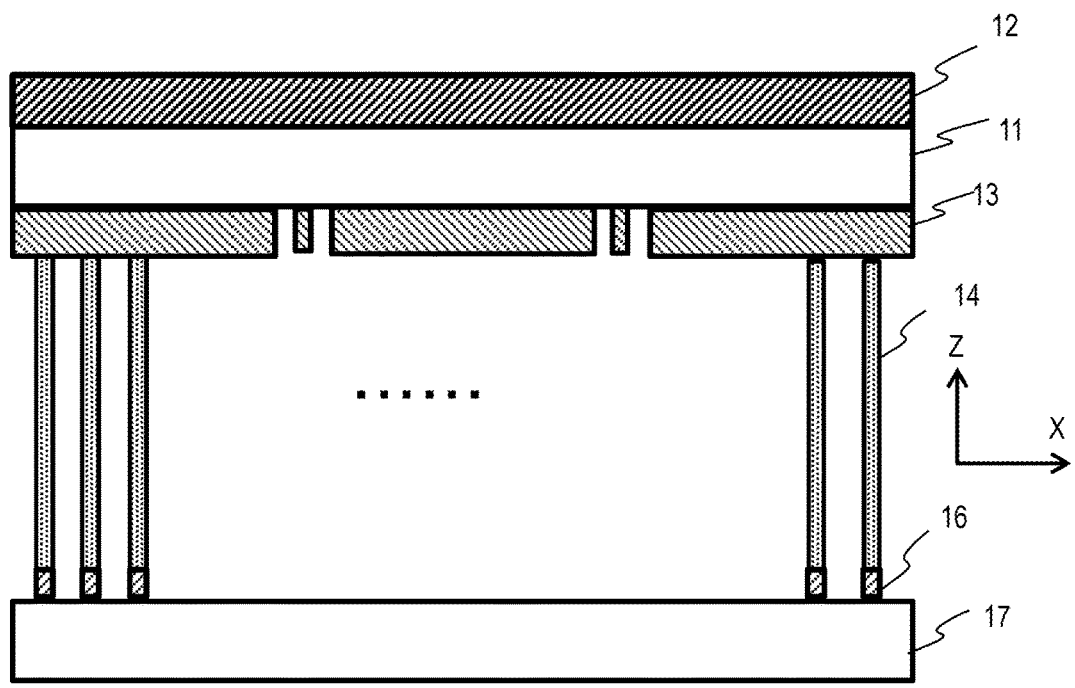
FIG. 14B schematically illustrates a cross-sectional structure of the light distribution controllable touch panel cut along the line B-B in FIG. 14A.

FIGS. 14A and 14B illustrate another configuration example of the light distribution controllable touch panel 1. FIG. 14A is a plan diagram for illustrating a relationship between the lower touch panel electrodes 13 and the lower light distribution control electrodes 16. FIG. 14A omits the parts connecting electrode pieces of the lower touch panel electrodes 13. The pattern of the lower touch panel electrodes 13 is the same as the pattern in FIG. 12B. FIG. 14B is a diagram schematically illustrating the cross-sectional structure of the light distribution controllable touch panel 1 cut along the line B-B in FIG. 14A.

The lower light distribution control electrodes 16 are provided on the top face of the lower transparent substrate 17 only in individual regions opposed to an electrophoretic element 14. This configuration increases the transmittance. Specifically, a plurality of lower light distribution control electrode lines 163 are defined on the top face of the lower transparent substrate 17 to extend in the Y-axis direction and be distant from one another in the X-axis direction. In FIG. 14A, one lower light distribution control electrode line is denoted by a reference number 163 by way of example.

Each lower light distribution control electrode line 163 is defined to match the underface of one electrophoretic element 14 when seen in the Z-axis direction. Each lower light distribution control electrode line 163 includes one or more lower light distribution control electrodes 16. One lower light distribution control electrode line 163 is opposed to one or two lower touch panel electrodes 13. Each lower light distribution control electrode 16 is opposed to only one lower touch panel electrode 13.

The light distribution controller 23 drives the lower light distribution control electrodes 16 with reference to the potentials of the opposite lower touch panel electrodes 13 as described with reference to FIGS. 8A to 11B. In the narrow viewing angle mode, the light distribution controller 23 provides each lower light distribution control electrode 16 with a potential equal to the potential for the opposite lower touch panel electrode 13. In the wide viewing angle mode, the light distribution controller 23 provides each lower light distribution control electrode 16 with a potential increased from the potential for the opposite lower touch panel electrode 13 by a predetermined voltage.

The above-described configuration and control enable the electrophoretic particles 140 in a whole electrophoretic element 14 to be maintained in an appropriate state for the selected viewing angle mode even in the case where the electrophoretic element 14 is opposed to two adjacent lower touch panel electrodes 13.

On the lower transparent substrate 17, wires to provide the driving potentials to the lower light distribution control electrodes 16 are formed of the same material as the lower light distribution control electrodes 16. The wires are provided on the same layer as the lower light distribution control electrodes 16 or on a different layer.

Figure 15:
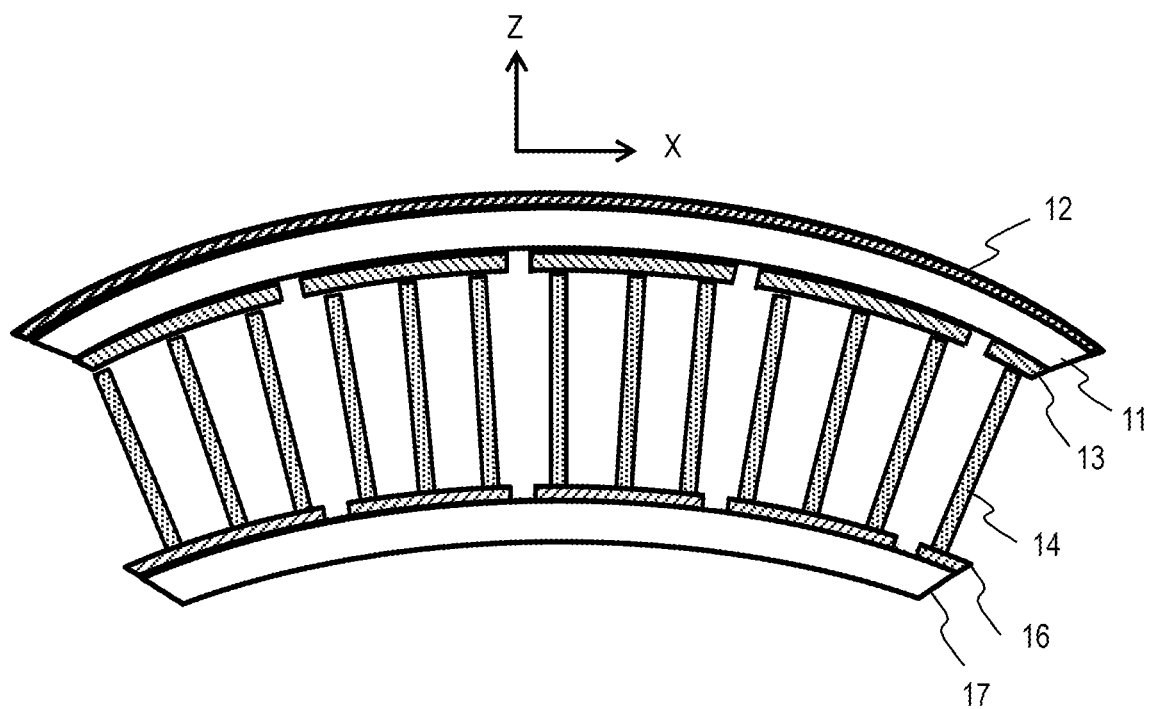
FIG. 15 illustrates another configuration example of the light distribution controllable touch panel.

FIG. 15 illustrates another configuration example of the light distribution controllable touch panel 1. The light distribution controllable touch panel 1 has a curved shape bulging toward the user who sees the display. In this example, the light distribution controllable touch panel 1 has a surface curved along the X-axis. That is, a line extending in the X-axis direction on the plane is curved and a line extending in the Y-axis direction is straight. This shape increases the transmittance of the outer region of the display surface. The upper touch panel electrodes 12, the lower touch panel electrodes 13, and the lower light distribution control electrodes 16 may have any of the patterns in the above-described embodiments.

In still another configuration example of the light distribution controllable touch panel 1, the touch panel electrodes are not provided on the top face of the upper transparent substrate 11 but are provided only on the underface of the upper transparent substrate 11. For example, electrodes extending in the X-axis direction and being distant from one another in the Y-axis direction and electrodes extending in the Y-axis direction and being distant from one another in the X-axis direction are provided on the underface of the upper transparent substrate 11 with an insulating layer interposed therebetween. The touch panel controller 21 detects a touch point by self-capacitance sensing.

As set forth above, embodiments of this invention have been described; however, this invention is not limited to the foregoing embodiments. Those skilled in the art can easily modify, add, or convert each element in the foregoing embodiment within the scope of this invention. A part of the configuration of one embodiment may be replaced with a configuration of another embodiment or a configuration of an embodiment may be incorporated into a configuration of another embodiment.

What is claimed is:

1. A light distribution controllable touch panel device comprising:
   an upper transparent substrate;
   a lower transparent substrate;
   a plurality of lower light distribution control electrodes on a top face of the lower transparent substrate;
   a plurality of touch panel electrodes on an underface of the upper transparent substrate, each of the plurality of touch panel electrodes being opposed to one or more of the plurality of lower light distribution control electrodes;
   a plurality of electrophoretic elements sandwiched between each of the plurality of lower light distribution control electrodes and a touch panel electrode opposed thereto of the plurality of touch panel electrodes, each of the electrophoretic elements including colored electrophoretic particles and a dispersion medium; and
   a controller,
   wherein the controller is configured to:
      detect a touch point, and in detecting the touch point, provide driving potentials to the plurality of touch panel electrodes for measuring capacitances; and
      control a light distribution, and in controlling the light distribution, provide driving potentials to the plurality of lower light distribution control electrodes with reference to the driving potentials given to the plurality of touch panel electrodes to control a state of the colored electrophoretic particles in the plurality of electrophoretic elements,
   wherein driving potentials provided to each of the plurality of touch panel electrodes have a period in common with and are in phase with driving potentials provided to the one or more of the plurality of lower light distribution control electrodes opposed thereto,
   wherein the controller is further configured to:
      maintain the colored electrophoretic particles in the plurality of electrophoretic elements in a dispersed state in a narrow viewing angle mode,
      provide the driving potentials for measuring capacitances to the plurality of touch panel electrodes all together in the narrow viewing angle mode;
      provide each of the one or more lower light distribution control electrodes with a potential equal to the driving potential given to a touch panel electrode opposed thereto in the narrow viewing angle mode,
      maintain the colored electrophoretic particles in the plurality of electrophoretic elements in a collected state in a wide viewing angle mode;
      provide the driving potentials for measuring capacitances to the plurality of touch panel electrodes all together in the wide viewing angle mode; and
      provide each of the one or more lower light distribution control electrodes with a potential having a predetermined potential difference from the driving potential given to a touch panel electrode opposed thereto in the wide viewing angle mode.

2. The light distribution controllable touch panel device according to claim 1,
   wherein each of the plurality of lower light distribution control electrodes is opposed to only one touch panel electrode, and
   wherein the controller is configured to:
      select the plurality of touch panel electrodes to be supplied with the driving potentials for measuring capacitances one by one; and
      select a first lower light distribution control electrode opposed to a selected first touch panel electrode from the plurality of lower light distribution control electrodes and provide the first lower light distribution control electrode with a potential equal to the driving potential given to the first touch panel electrode.

3. The light distribution controllable touch panel device according to claim 1,
   wherein each of the plurality of lower light distribution control electrodes is opposed to only one touch panel electrode, and
   wherein the controller is configured to:
      select the plurality of touch panel electrodes to be supplied with the driving potentials for measuring capacitances one by one; and
      select a first lower light distribution control electrode opposed to a selected first touch panel electrode from the plurality of lower light distribution control electrodes and provide the first lower light distribution control electrode with a potential having the predetermined potential difference from the driving potential given to the first touch panel electrode.

4. The light distribution controllable touch panel device according to claim 1, further comprising a plurality of upper touch panel electrodes on a top face of the upper transparent substrate,
   wherein the controller is configured to provide driving potentials to the plurality of touch panel electrodes on the underface of the upper transparent substrate and measure capacitances at the upper touch panel electrodes.

5. The light distribution controllable touch panel device according to claim 1,
   wherein the plurality of electrophoretic elements are disposed to extend in a first direction and be side by side in a second direction perpendicular to the first direction, wherein the plurality of touch panel electrodes and the plurality of lower light distribution control electrodes are disposed to extend in the first direction and be side by side in the second direction, and wherein each electrophoretic element is sandwiched by only one touch panel and only one lower light distribution control electrode.

6. The light distribution controllable touch panel device according to claim 5, further comprising a plurality of upper touch panel electrodes disposed to extend in the second direction and be side by side in the first direction on a top face of the upper transparent substrate.

7. The light distribution controllable touch panel device according to claim 1, further comprising a plurality of upper touch panel electrodes on a top face of the upper transparent substrate, wherein the plurality of touch panel electrodes provided on the underface of the upper transparent electrodes are a plurality of lower touch panel electrodes, wherein the plurality of lower touch panel electrodes are disposed to extend in a first direction and be side by side in a second direction perpendicular to the first direction, wherein the plurality of upper touch panel electrodes are disposed to extend in the second direction and be side by side in the first direction, wherein each of the plurality of lower touch panel electrodes and each of the plurality of upper touch panel electrodes have a configuration such that a plurality of electrode pieces are chained, and wherein the plurality of lower touch panel electrodes are more in number than the plurality of upper touch panel electrodes.

8. The light distribution controllable touch panel device according to claim 1, wherein a pattern of the plurality of touch panel electrodes opposed to the plurality of electrophoretic elements is identical to and superposed on a pattern of the plurality of lower light distribution control electrodes opposed to the plurality of electrophoretic elements.

9. A display device comprising:
a display panel; and
a light distribution controllable touch panel device disposed in front of the display panel,
wherein the light distribution controllable touch panel device includes:
an upper transparent substrate;
a lower transparent substrate;
a plurality of light distribution control electrodes on a top face of the lower transparent substrate;
a plurality of touch panel electrodes on an underface of the upper transparent substrate, each of the plurality of touch panel electrodes being opposed to one or more of the plurality of lower light distribution control electrodes;
a plurality of electrophoretic elements sandwiched between each of the plurality of light distribution control electrodes and a touch panel electrode opposed thereto of the plurality of touch panel electrodes, each of the electrophoretic elements including colored electrophoretic particles and a dispersion medium; and
a controller,
wherein the controller is configured to:
detect a touch point, and in detecting the touch point, provide driving potentials to the plurality of touch panel electrodes for measuring capacitances; and
control a light distribution, and in controlling the light distribution, provide driving potentials to the plurality of lower light distribution control electrodes with reference to the driving potentials given to the plurality of touch panel electrodes to control a state of the colored electrophoretic particles in the plurality of electrophoretic elements,
wherein driving potentials provided to each of the plurality of touch panel electrodes have a period in common with and are in phase with driving potentials provided to the one or more of the plurality of lower light distribution control electrodes opposed thereto, and
wherein the controller is further configured to:
maintain the colored electrophoretic particles in the plurality of electrophoretic elements in a dispersed state in a narrow viewing angle mode,
provide the driving potentials for measuring capacitances to the plurality of touch panel electrodes all together in the narrow viewing angle mode;
provide each of the one or more lower light distribution control electrodes with a potential equal to the driving potential given to a touch panel electrode opposed thereto in the narrow viewing angle mode,
maintain the colored electrophoretic particles in the plurality of electrophoretic elements in a collected state in a wide viewing angle mode;
provide the driving potentials for measuring capacitances to the plurality of touch panel electrodes all together in the wide viewing angle mode; and
provide each of the one or more lower light distribution control electrodes with a potential having a predetermined potential difference from the driving potential given to a touch panel electrode opposed thereto in the wide viewing angle mode.

* * * * *